(12) United States Patent
Geppert

(10) Patent No.: US 7,930,264 B2
(45) Date of Patent: Apr. 19, 2011

(54) MULTI-MODULE AUTHENTICATION PLATFORM

(75) Inventor: Mike Geppert, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 685 days.

(21) Appl. No.: 11/951,425

(22) Filed: Dec. 6, 2007

(65) Prior Publication Data

US 2009/0150320 A1    Jun. 11, 2009

(51) Int. Cl.
*G06F 17/00* (2006.01)
*G06N 5/02* (2006.01)

(52) U.S. Cl. ......................................................... 706/47
(58) Field of Classification Search ...................... 706/47
See application file for complete search history.

(56) References Cited

U.S. PATENT DOCUMENTS

| | | | |
|---|---|---|---|
| 7,295,831 B2 * | 11/2007 | Coleman et al. | 455/410 |
| 7,814,005 B2 * | 10/2010 | Imrey et al. | 705/38 |
| 7,818,229 B2 * | 10/2010 | Imrey et al. | 705/35 |
| 7,848,978 B2 * | 12/2010 | Imrey et al. | 705/35 |
| 2003/0074580 A1 | 4/2003 | Knouse et al. | |
| 2005/0097320 A1* | 5/2005 | Golan et al. | 713/166 |
| 2005/0273442 A1* | 12/2005 | Bennett et al. | 705/67 |
| 2007/0180493 A1 | 8/2007 | Croft et al. | |
| 2007/0245403 A1 | 10/2007 | Ginter et al. | |

OTHER PUBLICATIONS

An extensible XACML authorization decision engine for context aware applications, Cheaito, M.; Laborde, R.; Barrere, F.; Benzekri, A.; Pervasive Computing (JCPC), 2009 Joint Conferences on Digital Object Identifier: 10.1109/JCPC.2009.5420155 Publication Year: 2009 , pp. 377-382.*
An access control model based on distributed knowledge management, Seleznyov, A.; Hailes, S.; Advanced Information Networking and Applications, 2004. AINA 2004. 18th International Conference on vol. 2 Digital Object Identifier: 10.1109/AINA.2004.1283832 Publication Year: 2004 , pp. 403-406 vol. 2.*
Distributed knowledge management for autonomous access control in computer networks, Seleznyov, A.; Hailes, S.; Information Technology: Coding and Computing, 2004. Proceedings. ITCC 2004. International Conference on vol. 2 Digital Object Identifier: 10.1109/ITCC.2004.1286686 Publication Year: 2004 , pp. 433-437 vol. 2.*
User-centric content negotiation for effective adaptation service in mobile computing, Wai Yip Lum; Lau, F.C.M.; Software Engineering, IEEE Transactions on vol. 29, Issue: 12 Digital Object Identifier: 10.1109/TSE.2003.1265524 Publication Year: 2003 , pp. 1100-1111.*
PCT International Search Report and Written Opinion mailed Feb. 3, 2009; International Application No. PCT/US08/13398, 11 pages.

* cited by examiner

*Primary Examiner* — Michael Holmes
(74) *Attorney, Agent, or Firm* — Kilpatrick Townsend and Stockton LLP

(57) ABSTRACT

Embodiments of the disclosure generally relate to systems and methods for authenticating users of an entity system. In embodiments, an authentication platform receives a request for authentication. The authentication platform interacts with one of several authentication modules to authenticate the user. Each authentication module may use different information or procedures to authenticate the user. If authenticated, the user is allowed access to the system. Having access to two or more authentication modules allows the authentication platform to provide automatically a more robust authentication and alleviates the entity system from needing to integrate the several authentication modules.

17 Claims, 10 Drawing Sheets

Fig. 4A
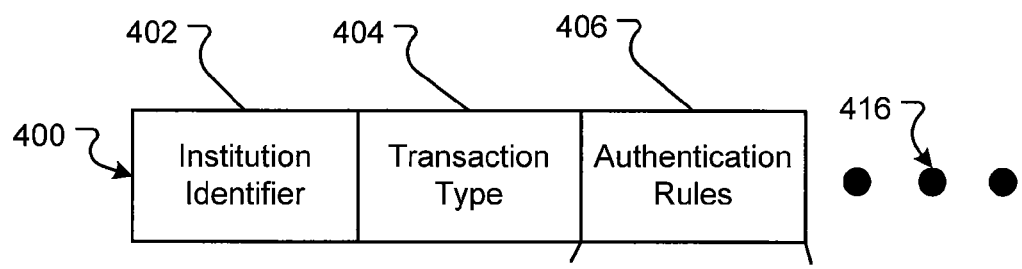
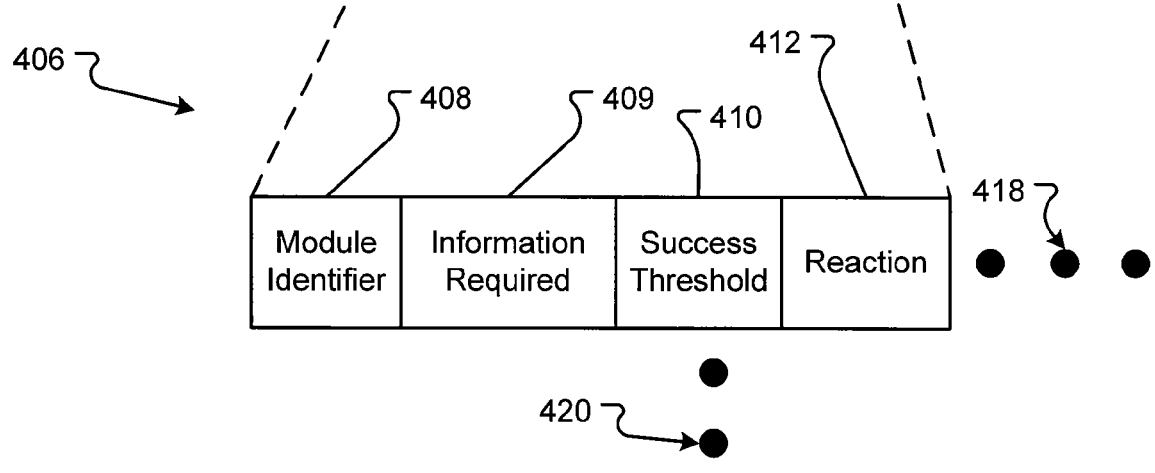
Fig. 4B

MULTI-MODULE AUTHENTICATION PLATFORM

BACKGROUND

This disclosure relates, in general, to authentication of users and, more specifically, but not by way of limitation, to authentication of customers attempting to create or access an account at a financial institution.

Identity theft and fraud have caused great losses for financial institutions and consumers alike. To combat the illegal or unauthorized use of a consumer's account, financial institutions generally require the consumer to authenticate themselves. For example, the consumer uses a password to enter his or her account.

Unfortunately, the people committing the fraud or stealing identities are continually becoming more sophisticated. The methods used to enter illegitimately another person's account generally requires an ever-increasing need for preventative measures. In some cases, financial institutions are trying to use two or more preventative measures to authenticate users. However, using several preventative measures becomes increasingly hard to integrate into the financial institution's system and hard to maintain the preventative measures.

It is in view of these and other considerations not mentioned herein that the embodiments of the present disclosure were envisioned.

BRIEF DESCRIPTION OF THE DRAWINGS

The present disclosure is described in conjunction with the appended figures:

FIGS. 4A-B are block diagrams of embodiments of one or more data structures for storing authentication rules in an authentication platform;

Figure 1:
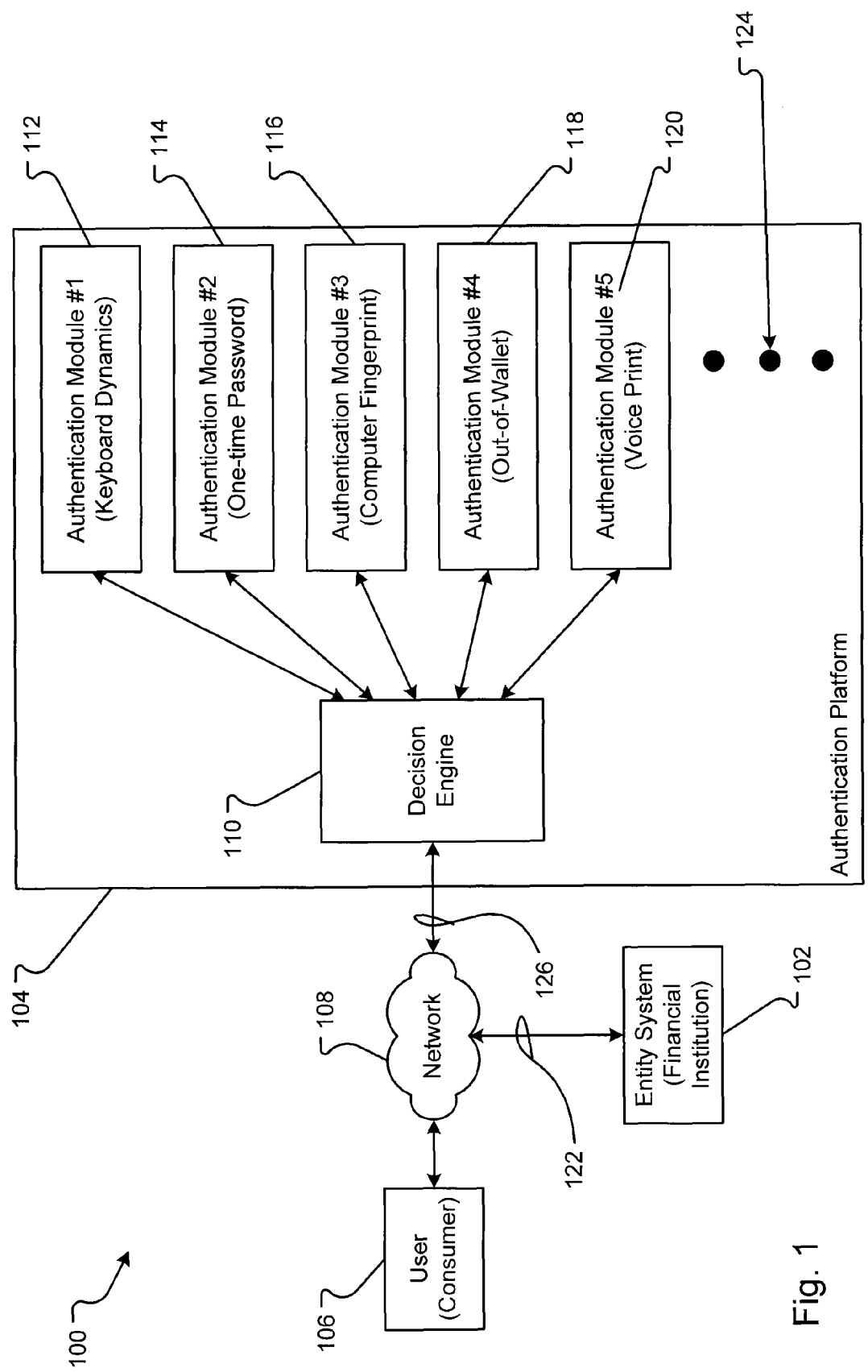
FIG. 1 is a block diagram of an embodiment of a system operable to authenticate a user desiring access to an entity system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiment(s) only and is not intended to limit the scope, applicability or configuration of the possible embodiments. Rather, the ensuing description of the exemplary embodiment(s) will provide those skilled in the art with an enabling description for implementing an exemplary embodiment. It being understood that various changes may be made in the function and arrangement of elements without departing from the spirit and scope of the possible embodiments as set forth in the appended claims.

Embodiments of the disclosure generally relate to systems and methods for authenticating users of a system. In embodiments, an authentication platform receives a request for authentication. The authentication platform interacts with at least one of several authentication modules to authenticate the user. Each authentication module may use different information or procedures to authenticate the user. If authenticated, the user is allowed access to the system. Having access to two or more authentication modules allows the authentication platform to provide automatically a more robust authentication and alleviates the entity from needing to integrate the several authentication modules into the entity's system.

Before describing several embodiments, an example of how the systems and methods may work may be useful. A new customer of a bank contacts the bank's website with the customer's computer. The customer requests to open a new account. The bank transfers the customer to an authentication service to verify the identity of the customer.

The authentication service has communicated with the bank to establish rules for how new or existing customers will have their identities verified. The new customer sent to the authentication service tests the new customer as to their identity. For example, the new customer enters identifying information such as his or her social security number, address, phone number, name, etc. These items of information may be checked for correlation. According to the rules the bank created, the authentication service may also ask an "out-of-pocket" question that can be verified with public records, such as, "what car did you drive in 1999?" After the identity of the new customer is verified to the liking of the bank, the authentication service may ask the new customer other questions to establish a security profile. For example, the new customer establishes a user name and password. How the password is entered, that is how the new customer hits each key on the keyboard, may be recorded. After the new customer has completed the information, he or she may be redirected back to the bank to open the account as a verified user.

When the customer returns to logon to the account that he or she created, the bank may again redirect the returning customer to the authentication service. The authentication service can test the authenticity of the returning customer according to a different set of rules established by the bank. For example, the returning customer may enter his or her user name and password. How the password is entered may be checked against stored information at the authentication service. The returning customer may be sent a one-time password to an email address the returning customer previously provided. The returning customer can enter the one-time password. After the returning customer has completed enough tests according to the rules established by the bank, the authentication service can redirect the customer back to the bank to access their existing account.

The example above will help understand the embodiments of systems and methods that follow. The above example also highlights the advantages of the embodiments described herein. Notably, the authentication service may employ several different types of tests to verify the customer. Further, the bank may establish rules with the authentication service to customize authentication procedures. Still further, how the customers are authenticated may change making it more difficult for a fraudster to impersonate the customer.

While various aspects of embodiments of the disclosure have been summarized above, the following detailed description illustrates exemplary embodiments in further detail to enable one of skill in the art to practice the disclosure. In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form. Several embodiments of the disclosure are described below, and while various features are ascribed to different embodiments, it should be appreciated that the features described with respect to one embodiment may be incorporated with another embodiment as well. By the same token, however, no single feature or features of any described embodiment should be considered essential to the disclosure, as other embodiments of the disclosure may omit such features.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments. A computing system may be used to execute any of the tasks or operations described herein. In embodiments, a computing system includes memory and a processor and is operable to execute computer-executable instructions stored on a computer readable medium that define processes or operations described herein.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as a storage medium. A processor(s) may perform the necessary tasks. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

An embodiment of a system 100 for authenticating a user or consumer 106 for access to an entity's systems 102 is shown in FIG. 1. A user 106 is the person desiring access to the entity's system 102 and any associated system, computer, or other hardware and/or software being used by the user 106 to access the entity's system 102. The entity system 102 is the entity, for example, a financial institution, a bank, a healthcare provider, etc., and any associated system, computer, or other hardware and/or software being used by the entity 102 to transact business, store data, sell services or products, etc. In embodiments, the system 100 comprises a consumer 106 in communication with an authentication platform 104 via a network 108, the authentication platform 104 also in communication with the entity system 102. The components of the system 100 may be located together at one location or may be distributed over a LAN, WAN, the Internet, or other network in physically different locations.

In embodiments, the consumer 106 desires access to the entity system 102 and sends a request for access to the entity system 102. The entity system 102, in embodiments, generates an authentication request and sends the authentication request to the authentication platform 104. The authentication platform may then evaluate the authentication request and respond back to the entity system 102 as to whether the consumer 106 is authenticated. The various components of the system 100 are described hereinafter.

A first communications channel 122 allows communication between the authentication platform 104 and the entity system 102, which may be in a distant location or located locally with or substantially near the authentication platform 104. The first communications channel 122 may be any type of communications system including wireless, wired, or other communication system. In one embodiment, the first communications channel 122 is a local area network (LAN), wide area network (WAN), or Internet connection. If a wireless communication channel, the first communication channel can be Bluetooth®, 802.11g, cellular, or other wireless system.

In embodiments, the system 100 includes a network 108. The network 108 provides a second communications channel. The second communications channel 126 allows the authentication platform 104 to communicate with a user 106, who may be located in a distant location. For example, the authentication platform 104 communicates with the user 106, who is located in another state or country. The network 108 may be a cellular network, a wireless LAN or WAN, the Internet, or other communication system.

The authentication platform 104, in embodiments, is a system, module, and/or device comprised of hardware and/or software that authenticates the user 106 before the user 106 can access the entity system 102 or create a new relationship, e.g., new account, new membership, etc., with the entity system 102. In embodiments, the authentication platform 104 is a hosted system through which the initial communications between the user 106 and the entity system 102 are routed. The authentication platform 104 is operable to receive communications from and send communications to the entity system 102. Further, the authentication platform 104 is operable to communicate with the network 108 to receive communications from and send communications to the user 106.

The authentication platform 104, in embodiments, comprises a decision engine 110 and two or more authentication modules 112, 114, 116, 118, and 120. In embodiments, the authentication platform 104 comprises fewer authentication modules than those shown in FIG. 1. In other embodiments, the authentication platform 104 comprises more authentication modules than those shown in FIG. 1, as represented by ellipses 124. In embodiments, an authentication module 112,

114, 116, 118, or 120 performs a type of authentication. For example, authentication module #1 112 authenticates a user 106 using keyboard dynamics, authentication module #2 114 authenticates a user 106 using a one-time password, authentication module #3 116 authenticates a user 106 using a computer fingerprint, authentication module #4 118 authenticates a user 106 using one or more out-of-wallet questions, authentication module #5 120 authenticates a user 106 using a voice print, etc. The computer fingerprint, one-time password, voice print, and/or keyboard dynamics may be compared against associated data stored at the authentication platform 104. Keyboard dynamics relates to the unique way (the speed at which the key is typed, the length a user 106 holds down a key, the duration between keystrokes, etc.) the user 106 types in a word or phrase, such as a password. A one-time password is a password that is sent to a user's known email account, cell phone, other device, or account that allows the user 106 to retrieve and use the password. A computer fingerprint is an item of information stored on the user's computer or generated from the unique characteristics of the user's computer, such as the type of computer, the date, the processor used, the amount of computer memory, the time, etc. An out-of-wallet question is a question directed to the user 106 that only the user 106 is likely to know, such as "What car did you drive in 1998?". A voice print is the unique characteristics of a person's voice based on frequency, amplitude, etc. when the user 106 says a predetermined phrase or word. One skilled in the art will recognize that other types of authentication processes or methods are possible and contemplated as being used in the system 100.

The decision engine 110, in embodiments, is hardware, software, or hardware and software that controls the authentication of the user 106. In embodiments, the decision engine 110 receives requests for authentication and one or more items of information from the user 106. Further, the decision engine 110 can store authentication rules created by the entity that controls the flow of authentication for the users 106 of the entity system 102. In embodiments, the one or more rules determine which authentication modules 112, 114, 116, 118, or 120 to use for authentication, the intensity of the authentication, the response to authentication failures, etc. The decision engine 110 may respond to the request for authentication, then read and respond to the rules to authenticate the user 106.

In operation, an entity may use the entity system 102 to create one or more authentication rules used by the decision engine 110 to authenticate one or more users 106. The decision engine 110 stores the rules. A user 106, in embodiments, requests access to or desires to establish a new relationship with the entity. The entity system 102 creates an authentication request and sends the authentication request to the authentication platform 104 to authenticate the user before he or she accesses the entity system 102. The decision engine 110 receives the request, which may include an identifier for the entity system 102 that the decision engine 110 can use to retrieve the one or more authentication rules associated with the entity system 102. The decision engine 110, in embodiments, retrieves the first rule to which to respond. The decision engine 110 can retrieve authentication information from the authentication request or can request authentication information from the user 106. In embodiments, the decision engine 110 provides the authentication information to at least one of the authentication modules 112, 114, 116, 118, or 120. The authentication module 112, 114, 116, 118, or 120 may determine if the user 106 is authenticated or may conduct a measurement or test of the authentication information and can return a response to the decision engine 110.

The decision engine 110, in embodiments, determines if the user 106 is authenticated from the return from the authentication module 112, 114, 116, 118, or 120. In other embodiments, the decision engine 110 responds to the return of authentication success or failure from the authentication module 112, 114, 116, 118, or 120. In embodiments, the decision engine 110 responds to or determines authentication success and sends a response to the entity system 102 to allow the user 106 to access the entity system 102. In alternative embodiments, the decision engine 110 determines or receives indication of authentication failure. The decision engine 110 may then retrieve another rule in response to the failure and can send information to another authentication module 112, 114, 116, 118, or 120. In other embodiments, the decision engine 110 sends a response to the entity system to prevent access of the user 106 to the entity system 102.

In an alternative embodiment, the decision engine 110 sends information to two or more authentication modules 112, 114, 116, 118, or 120 at substantially the same time and evaluates together the returns from the two or more authentication modules 112, 114, 116, 118, or 120 to determine if the user is authenticated. In other words, if the entity desires that two or more authentication modules 112, 114, 116, 118, or 120 be used, the decision engine 110 need not interact with the two or more authentication modules 112, 114, 116, 118, or 120 serially but may have the two or more authentication modules 112, 114, 116, 118, or 120 process the authentication tests in parallel.

In embodiments, the entity is a financial institution and the entity system 102 is a financial institution system. Hereinafter, embodiments may be described using the example of the financial institution, but this exemplary description is not meant to limit the embodiments to the financial institution. Other embodiments may include other systems that use the authentication platform 104 to authenticate users, for example, healthcare institutions, schools, etc.

Figure 2:
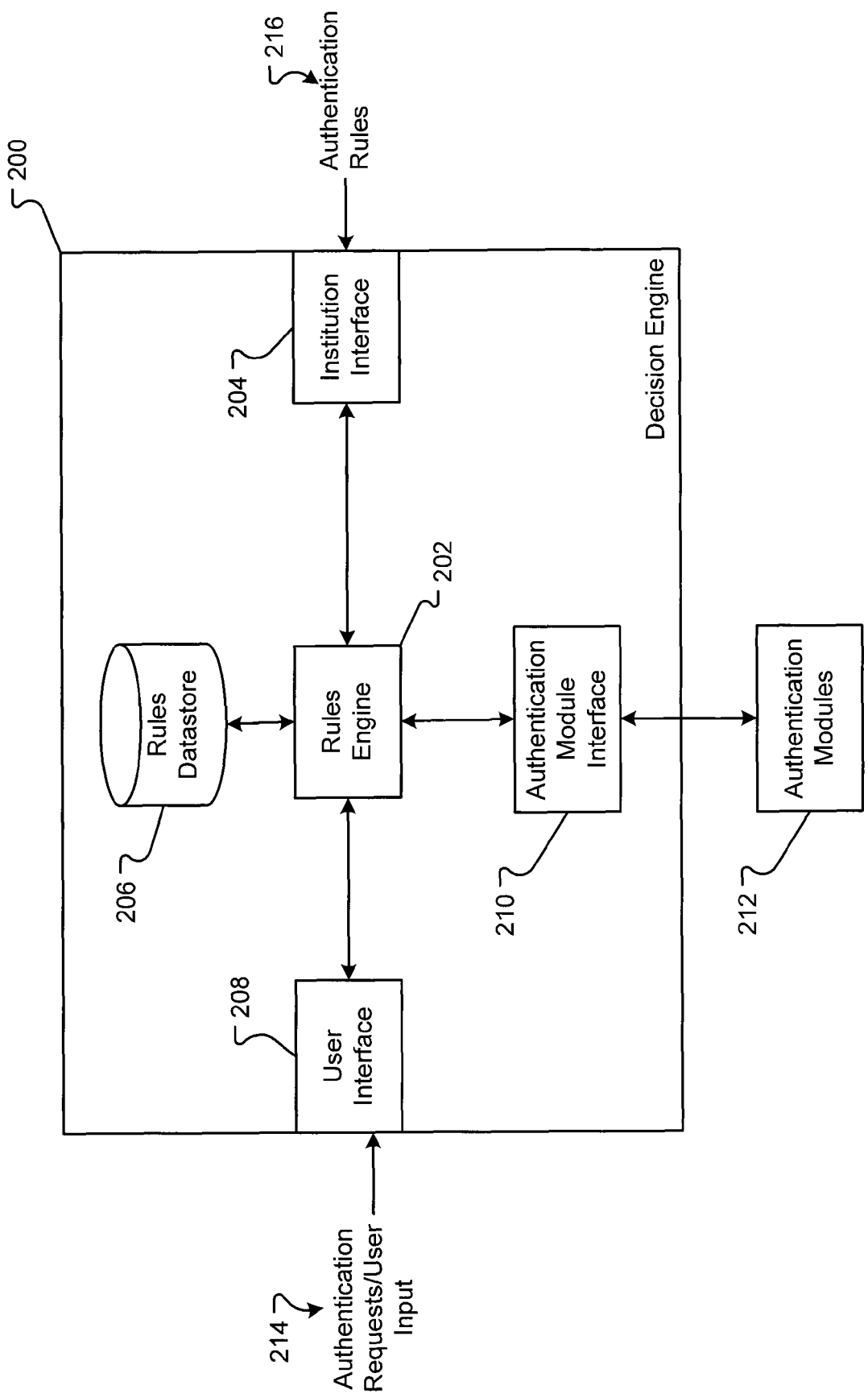
FIG. 2 is a hardware and/or software block diagram of an embodiment of a authentication platform for use in a system for authenticating users.

An embodiment of the decision engine 200 is shown in FIG. 2. In embodiments, the authentication decision engine 200 is the same or similar to the decision engine 110 (FIG. 1). The decision engine 200, in embodiments, comprises a user interface 208, an institution interface 204, a rules engine 202, a rules datastore 206, and/or an authentication module interface 210. The user interface 208 interacts with a user 106 (FIG. 1) to receive user input 214 or send communication to the user 106 (FIG. 1). User input 214 may be a request for authentication or one or more items of authentication information provided to the rules engine 202 or one or more authentication modules 212 to authenticate the user 106 (FIG. 1). The user interface 208, in embodiments, is hardware, software, or hardware and software for communicating with the user 106 (FIG. 1) and the user' system. The user interface 208 may be a communication systems for communicating over a LAN, WAN, the Internet, a wireless LAN, etc. The user interface 208 may also provide output to display on a system of the user 106 (FIG. 1). For example, the user interface 208 generates a web page that is shown on a display device of the user 106 (FIG. 1).

The institution interface 204 is similar to the user interface 208 in that the institution interface 204 receives inputs from an entity system 102 (FIG. 1) and outputs one of more displays or other information to the entity system 102 (FIG. 1). One of the inputs from the entity system 102 (FIG. 1) may be one or more authentication rules 216. The institution interface 204, in embodiments, is hardware, software, or hardware and software for communicating with the entity system 102 (FIG.

1). The institution interface 204 may be a communication systems for communicating over a LAN, WAN, the Internet, a wireless LAN, etc.

The authentication module interface 210 is also similar to the user interface 208 and the institution interface 204 in that the authentication module interface 210 communicates with the authentication modules 212. The authentication modules 212 may be the same or similar to the authentication modules 112 (FIG. 1), 114 (FIG. 1), 116 (FIG. 1), 118 (FIG. 1), or 120 (FIG. 1). The authentication module interface 210 can send authentication information to the authentication modules 212 and receive replies or returns from the authentication modules 212. The authentication module interface 210, in embodiments, is hardware, software, or hardware and software for communicating with the authentication modules 212. The authentication module interface 210 may be communication systems for communicating over a LAN, WAN, the Internet, a wireless LAN, etc. In alternative embodiments, the authentication module interface 210 is a translator or an API that changes the common requests, commands, and/or replies of the rules engine 202 into program specific requests, commands, and/or replies of the one or more authentication modules 212. In embodiments, each authentication module 212 may have a different protocol, format, or method of communication to which the authentication module interface 210 adjusts. As such, the authentication platform 104 (FIG. 1) may integrate authentication modules 212 from different vendors and still provide a common interface to the user 106 (FIG. 1) and the entity system 102 (FIG. 1).

In embodiments, the rules datastore 206 stores information about one or more rules 216 received from the financial institution. The rules datastore 206 may be hardware, software, or hardware and software for storing data. In embodiments, the rules datastore 206 is memory or a storage device operable to store data. For example, the rules datastore 206 is random access memory (RAM), read only memory (ROM), an optical storage device, magnetic media, etc., either integrated with the authentication decision engine 200 or configured as a separate device. Further, the rules datastore 206 may be software to control the storage of data, for example, a file system or other software. The authentication rules 216 may be stored in the rules datastore 206 in a relational database or other manner. Further description of the rules datastore 206 is provided in conjunction with FIGS. 4A-B.

The rules engine 202, in embodiments, is hardware, software, or hardware and software for executing authentication rules, stored in the rules datastore 206, in response to authentication requests 214. The rules engine 202 may be a software program executed in a processor or may be separate hardware and/or software for completing the functions described herein. In embodiments, the rules engine 202 receives authentication rules 216 or assists the financial institution in generating the authentication rules 216. The rules engine 202 can store the created rules in the rules datastore 206. The rules engine 202 executes one or more authentication rules 216 in response to user input 214, such as an authentication request 214. The authentication rule 216 executed by the rules engine 202, in embodiments, requires the rules engine 202 to send authentication information, through the authentication module interface 210, to one of the authentication modules 212. The authentication module 212 may determine from the user input 214 if the user is authenticated or conduct a measurement or test of the authentication information and can return a response to an authentication module interface 210 for the rules engine 202.

The rules engine 202, in embodiments, determines if the user is authenticated from the return from the authentication module 212. In other embodiments, the rules engine 202 responds to the return of authentication success and allows the user 106 (FIG. 1) to access the entity system 102 (FIG. 1). In alternative embodiments, the rules engine 202 determines or receives indication of authentication failure and, in response, may then retrieve another rule from the rules datastore 206 and can send information to another authentication module 212. In other embodiments, the rules engine 202 prevents access of the user to the institution.

Figure 3:
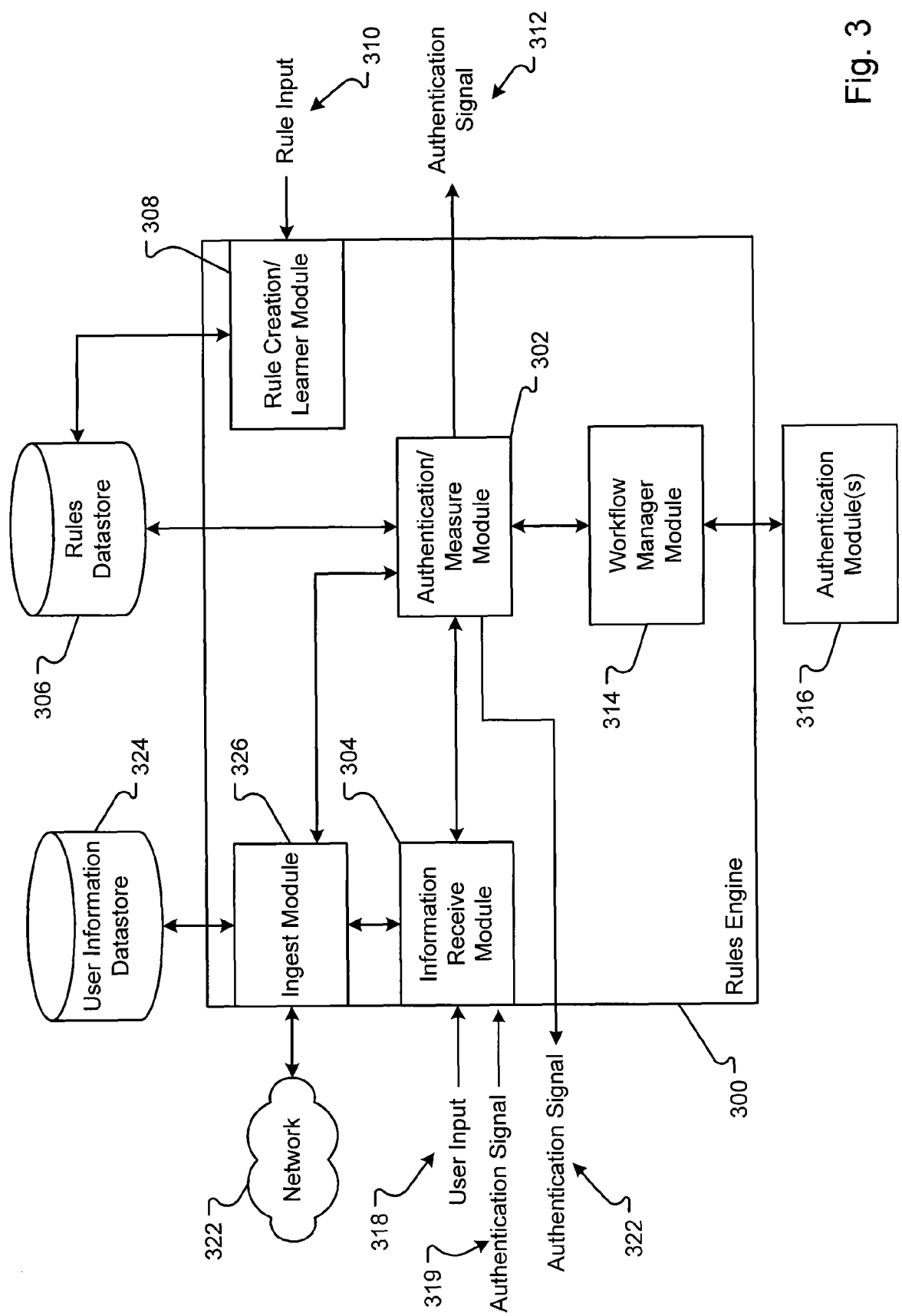
FIG. 3 is a block diagram of an embodiment of a rules engine for use in an authentication platform for authenticating users.

An embodiment of a rules engine 300 is shown in FIG. 3. The rules engine 300 may be hardware, software, or hardware and software operable to complete the functions described herein. In an embodiment, the rules engine 300 comprises one or more software modules that have one or more computer-executable instructions for completing the operations described herein. The rules engine 300, in embodiments, comprises an information receive module 304, an authentication/measure module 302, a workflow manager module 314, an ingest module 326, and/or a rule creation/learner module 308.

In embodiments, the information receive module 304 receives user input 318. The information receive module 304 can receive authentication information in one or more transmissions of user input 318. The information receive module 304 may extract authentication information, for example, passwords, voice prints, computer signatures, etc., from the user input 318 and provide the information to the authentication/measure module 302. In alternative embodiments, the information receive module 304 receives requests 319 for authentication that initiates an authentication. The information receive module 304 can pass the authentication request 319 to the authentication/measure module 302 to begin the authentication.

In embodiments, the information receive module 304 also provides the one or more items of authentication information to an ingest module 326. The ingest module 326, in embodiments, can store the one or more items of authentication information into a user information datastore 324 for later retrieval. For example, the ingest module 326 stores the computer fingerprint for a user and can provide the stored computer fingerprint to the authentication/measure module 302 for later comparison.

In alternative embodiments, the ingest module 326 retrieves public or other information from outside sources through a network 322. For example, the ingest module 326 retrieves information from a department of motor vehicle, health insurance provider, the Social Security Administration, etc. The information retrieved may be forwarded to the authentication/measure module 302 for use in authentication.

In other alternative embodiments, the information receive module 304 requests additional information from the user. For example, the information receive module 304 requests the user 106 (FIG. 1) to enter a one-time password or a voice print by saying a phrase or word into a microphone and sending the audio data to the information receive module 304. The information receive module 304 can send information, e.g., the one-time password, to the user 106 (FIG. 1) by requesting the email address of the user 106 (FIG. 1) from the ingest module 326, which retrieves the email address from the user information datastore 324.

The rule creation/learner module 308 receives rule inputs 310 from a financial institution or other entity to create the one or more authentication rules. In embodiments, the rule creation/learner module 308 provides an interface to the entity for authentication rule creation. The interface may be a display with one or more questions or other requests for information that allow the rule creation/learner module 308 to formulate an authentication rule. For example, the rule creation/learner module 308 may determine if the entity desires to use a keyboard dynamics for authentication. The questions may also ask at what confidence level or other measure should be considered successful authentication. For example, authentication is successful if the keyboard dynamics comparison is 80% correct or higher. The rule creation/learner module 308, in embodiments, also helps form a part of the authentication rule directed to the reaction to an authentication success or failure. The one or more determinations are rule input 310 that the rule creation/learner module 308 can use to formulate authentication rules and store the authentication rules into the rules datastore 306. The rules data store 306 may be the same or similar to the rules datastore 206 (FIG. 2). The rules may be created contemporaneously with the authentication of a user or, in embodiments, the rules are created one time by the entity, stored, and automatically read and used by the authentication/measure module 302 as authentication requests are received.

The workflow manager module 314 determines with which authentication modules 316 to communicate and how to communicate with the authentication modules 316. The authentication/measure module 302, in embodiments, provides the authentication information needed for a predetermined authentication and requests authentication from one or more authentication modules 316. The workflow manager module 314 can reformat the request and authentication information into a form understandable by the authentication modules 316 and forward the request to the authentication modules 316. The workflow manager module 314, in embodiments, receives the reply from the authentication modules 316 and returns the response to the authentication/measure module 302 in a form understandable by the authentication/measure module 302. The workflow manager module 314 may be modified to accommodate different communications with new authentication modules 316 when the new authentication modules 316 are added. As such, while the workflow manager module may change, the interfaces to the authentication/measure module 302, the user 106 (FIG. 1), or the entities remains unchanged during these upgrades. Thus, the workflow manager module 314 allows the authentication platform to be easily upgradeable.

The authentication/measure module 302, in embodiments, completes the authentications for users 106 (FIG. 1). As such, the authentication/measure module 302 receives user input 318 from the information receive module 304, including requests 319 for authentication. Based on the authentication information within the user input 318, the authentication/measure module 302 can determine which entity's rules to use and retrieves the first rule associated with authentication for the entity from the rules datastore 306. The rule stored in the rules datastore 306 may then determine which of the authentication modules 316 to use for the authentication.

The authentication/measure module 302, in embodiments, forwards the request for authentication using the predetermined authentication modules 316, with the required information, to the workflow manager module 314. The information sent to the workflow manager module 314 may include authentication information received in the initial user input 318. In alternative embodiments, the authentication/measure module 302 may request additional information from the user 106 (FIG. 1) in which the information receive module 304 forwards the request to the user 106 (FIG. 1). For example, the information receive module 304 sends a display to the user's computer asking a question or requesting the user to enter some form of information, e.g., a voice print, fingerprint, one-time password, etc. In alternative embodiments, the authentication/measure module 302 also sends other stored data or data from public or other sources to the workflow manager module 314. For example, the authentication/measure module 302 requests, from the ingest module 326, the user's 106 (FIG. 1) previous voice print(s) stored in the user information datastore 324. The previous voice print(s) may then be forwarded to the workflow manager module 314 with the user's current voice print received from the information receive module 304.

The authentication/measure module 302, in embodiments, also receives the result from the authentication modules 316 and responds to the result. In embodiments, one or more authentication modules 316 returns a binary result, that is, the user is authenticated or is not authenticated. In other embodiments, one or more authentication modules 316 returns a measurement. For example, the voice print authentication module 316 returns a likeness score, that is, the received voice print is some percentage like the stored voice print(s). The authentication/measure module 302 can compare the score received from the one or more authentication modules 316 and compare the received score to the threshold established in the authentication rule. If the received score is above the threshold, the user is authenticated. In alternative embodiments, if the received score is substantially near but not over the threshold, the authentication/measure module 302 attempts to conduct further authentication using one or more other authentication modules 316. In still other embodiments, the authentication/measure module 302 conducts authentication with two or more authentication modules 316 substantially simultaneously and uses the results from the two or more authentication modules 316 to determine authentication success.

If authentication is successful, the authentication/measure module 302 can send an authentication signal 322 to the user 106 (FIG. 1) verifying successful authentication. The authentication signal 322 may also grant access to the entity system 102 (FIG. 1). In alternative embodiments, the authentication/measure module 302 also sends an authentication signal 312 to the entity verifying successful authentication. The authentication signal 312 may also request the entity to grant access for the user to the entity system 102 (FIG. 1). If authentication fails, the authentication/measure module 302 may send a failure signal (not shown) to the user 106 (FIG. 1) or request the user 106 (FIG. 1) to complete other actions, for example, call the entity's customer service, inform a security entity of possible fraud, etc.

In an alternative embodiment, an authentication score model is used. The authentication/measure module 302, in embodiments, compares the authentication result from one or more authentication modules 316 to a score set in a rule. The score is a relative number that may be a percentage, a number, or other threshold. Each authentication module 316 may return a score of how well the user's input matched information stored earlier for the user. For example, the returned score is a percentage that may be compared to an authentication percentage threshold in a rule. For example, authentication fails if the returned percentage of 65% is lesser than the threshold of 85%. In further embodiments, the returned percentage from two or more authentication modules 316 may be combined to determine the returned percentage. For example, a returned percentage of 95% is averaged with the returned percentage of 85% to produce a percentage of 90%. The 90% returned percentage may then be compared to the threshold. Authentication scores above the threshold mean the user is authenticated An embodiment of an authentication rule data structure 400 for storing one or more rules in a rules datastore is shown in FIGS. 4A and 4B. The authentication rule data structure 400, in embodiments, is stored in a rules datastore similar or the same as rules datastore 306 (FIG. 3) and/or rules datastore 206 (FIG. 2). The rules datastore may include one or more authentication rules data structures 400 as evidenced by the ellipses 414. Embodiments of the authentication rule data structure 400 includes one or more fields, which may include, but are not limited to, an institution identifier field 402, a transaction type field 404, and/or one or more authentication rules 406. The authentication rule data structure 400 may include fewer or more fields than those shown in FIG. 4 as represented by the ellipses 416. In embodiments, two or more authentication rules data structures 400 may apply to the same entity identified in the institution identifier field 402 or the same type of transaction identified in the transaction type field 404.

The institution identifier field 402 includes an identifier for the financial institution or other entity that created the authentication rule for use with the entity's customers. The institution identifier field 402 may include an entity name, a globally unique identifier (GUID), or other identifier that allows the authentication platform 200 (FIG. 2) and the entity system 202 (FIG. 2) to recognize which authentication rules apply to the user requesting the authentication. For example, the user input 318 (FIG. 3) sent by a user 106 (FIG. 1) can include the institution identifier that the authentication/measure module 302 (FIG. 3) can match to the institution identifier in the institution identifier field 402 to determine which authentication rules to use for the user 106 (FIG. 1).

The transaction type field 404 includes information for the authentication platform 200 (FIG. 2B) that allows the authentication platform 200 (FIG. 2B) to respond to a certain type of request from the user 106 (FIG. 1). For example, a user 106 (FIG. 1) may be attempting to create an account with the financial institution. This type of transaction may require different authentication rules because there is as yet no information stored in the user information datastore 324 (FIG. 3) for the user 106 (FIG. 1). In another example, the user 106 (FIG. 1) may be requesting access to an existing account which can require still different authentication rules. There may be other types of transactions not mentioned herein that one skilled in the art will recognize are contemplated as possible embodiments. In embodiments, the transaction type field 404 includes an identifier or other information that can be used to match the request received in the user input 318 (FIG. 3) with the authentication rules for that type of transaction. The transaction type field 404, in embodiments, includes the name of the transaction, e.g., access, account creation, etc., or an understood identifier for the transaction.

In embodiments, the authentication rules 406 includes the one or more authentication rules used for the institution identified in the institution identifier field 402 and for the transaction identifier in the transaction type field 404. An embodiment of an authentication rule 406 is shown in FIG. 4B. In embodiments, a transaction type may require authentication using two or more authentication methods executed by two or more authentication modules 316 (FIG. 3), as represented by the ellipses 420. Further, in embodiments, each authentication rule 406 may include fewer or more fields than those shown in FIG. 4B, as represented by the ellipses 418. In embodiments, the authentication rules 406 are comprised of a module identifier field 408, an information required field 409, a success threshold field 410, and/or a reaction field 412.

In embodiments, the module identifier field 408 identifies which of the authentication modules 316 (FIG. 3) should be used for the user authentication associated with the institution identified in the institution identifier field 402 and for the transaction identified in the transaction type field 404. The module identifier field 408 may include, a module name, a GUID, or other identifier that allows the rules engine 202 (FIG. 2) to determine which of the authentication modules 316 (FIG. 3) to use.

The information required field 409, in embodiments, includes the one or more items of information the authentication module 316 (FIG. 3) will need to complete the authentication. The information in the information required field 409 may include information from the user input 318 (FIG. 3) and/or information retrieved from the user information datastore 324 (FIG. 3), or information from another source and provided by the ingest module 326 (FIG. 3). The authentication/measure module 302 (FIG. 3), in embodiments, reads the information required field 409 and obtains the information listed to provide to the workflow manager module 314 (FIG. 3) to send to the authentication module 316 (FIG. 3).

The success threshold field 410 can include the measure or the indicator used by the authentication/measure module 302 (FIG. 3) to determine if authentication is successful. In some embodiments, the success threshold field 410 includes no information or an indication that the authentication module 316 (FIG. 3) returns an indication of authentication success or failure. In alternative embodiments, the success threshold field 410 includes a score, for example, 80%, with which the authentication/measure module 302 (FIG. 3) compares to the score returned by the authentication module 316 (FIG. 3). If the returned score is higher than the score provided in the success threshold field 410, the authentication/measure module 302 (FIG. 3) can indicate authentication success. In alternative embodiments, the success threshold field 410 may include two or more thresholds with each threshold having a separate associated reaction. For example, if the score returned by the authentication module 316 (FIG. 3) is higher than a first threshold, the authentication/measure module 302 (FIG. 3) can authentication success. However, if the score returned by the authentication module 316 (FIG. 3) is lower than a first threshold but higher than a second threshold listed in the success threshold field 410, the authentication/measure module 302 (FIG. 3) can attempt another type of authentication with a different authentication module 316 (FIG. 3). If the score is below both thresholds, the authentication/measure module may indicate authentication failure.

The reaction field 412, in embodiments, includes the response for the authentication/measure module 302 (FIG. 3) associated with authentication successful and/or failure. For example, the reaction field 412 contains the rule that the authentication/measure module 302 (FIG. 3) should attempt another type of authentication with a different authentication module 316 (FIG. 3) if the score returned by the authentication module 316 (FIG. 3) is lower than a first threshold but higher than a second threshold listed in the success threshold field 410. In alternative embodiments, the reaction field 412 provides an instruction to the authentication/measure module 302 (FIG. 3) to allow access and/or to send the authentication signal 322 (FIG. 3) and/or authentication signal 312 (FIG. 3) if authentication is successful. Further, the reaction field 412 may include instructions for the authentication/measure module 302 (FIG. 3) if authentication is a failure. For example, the rule in the reaction field 412 for authentication failure may be to try another authentication rule with a different identifier in the module identifier field 408. In another example, the instruction in the reaction field 412 may be to deny access and/or request the user 106 (FIG. 1) contact customer service. In still another example, the instruction in the reaction field 412 may be to alert a security entity of a possible fraud and/or collect information on the fraudster.

Figure 5:
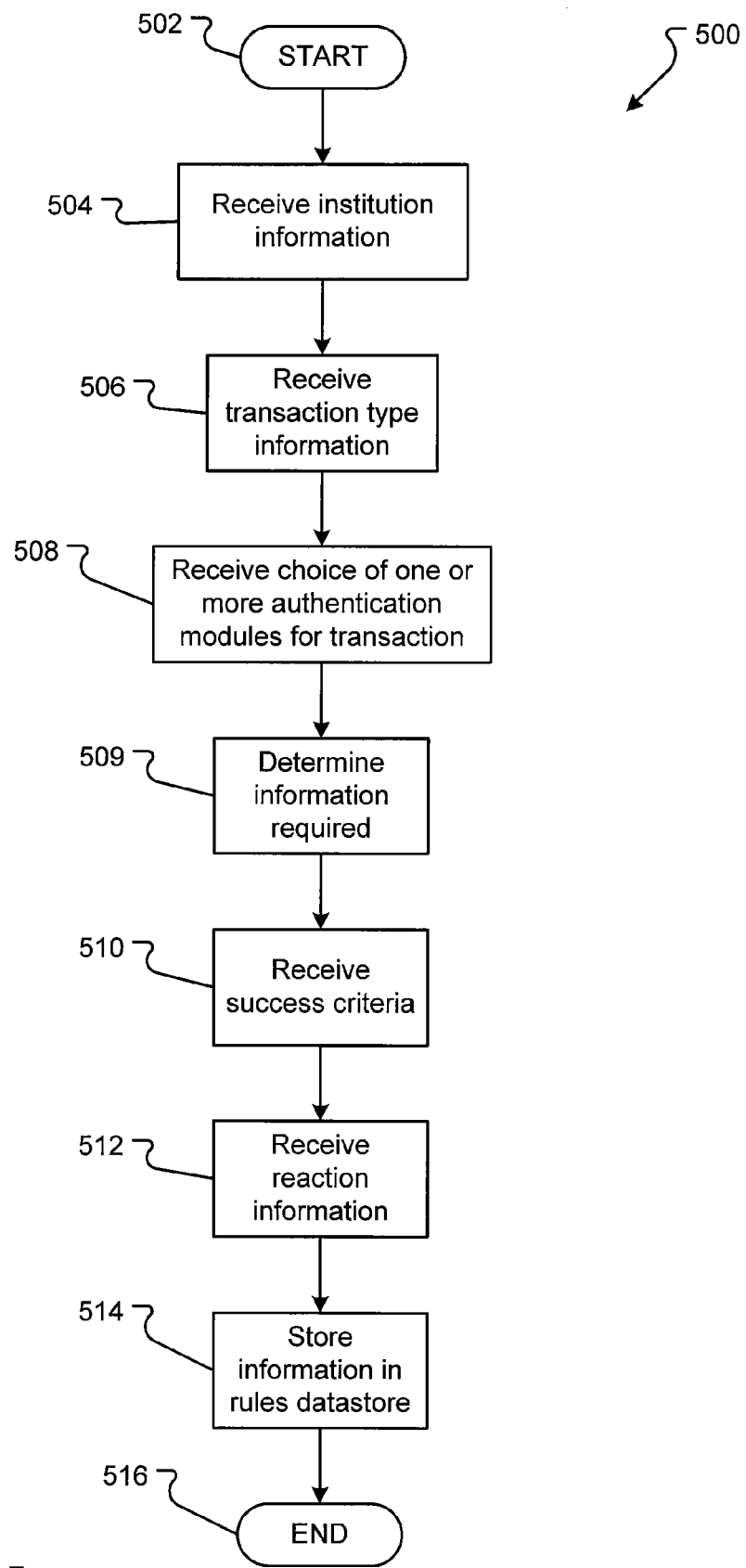
FIG. 5 is a flow diagram of an embodiment of a process for creating an authentication rule executed at an authentication platform.

An embodiment of a method 500 executed at an authentication platform 200 (FIG. 2) for creating an authentication rule is shown in FIG. 5. In embodiments, the method 500 generally begins with a START operation 502 and terminates with an END operation 516. The steps shown in the method 500 may be executed in a computer system as a set of computer-executable instructions. While a logical order is shown in FIG. 5, the steps shown or described can, in some circumstances, be executed in a different order than presented herein.

Receive operation 504 receives institution information. In embodiments, an entity operating an entity system 102 (FIG. 1) initiates the rule creation method 500. The entity may interact with a rule creation/learner module 308 (FIG. 3) to initiate the method 500. The entity operating an entity system 102 (FIG. 1), in embodiments, sends rules information 216 (FIG. 2) to the authentication platform 200 (FIG. 2). In embodiments, the rule creation/learner module 308 (FIG. 3) receives the rule input 310 (FIG. 3) through interactions with the entity through a web service or other system or process allowing for communication between an administrator or other user at the entity and the authentication platform 200 (FIG. 2). A rule creation/learner module 308 (FIG. 3), in embodiments, receives the rule input 310 (FIG. 3). The rule input 310 (FIG. 3) can comprise an identifier for the entity. The identifier may be a name, a GUID, or other identifier for the entity. In embodiments, the rule creation/learner module 308 (FIG. 3) creates an authentication rule data structure 400 (FIG. 4) for the new rule. The identifier received from the entity may be stored in the institution identifier field 402 of the rule data structure 400 (FIG. 4).

Receive operation 506 receives transaction type information. In embodiments, the entity operating the entity system 102 (FIG. 1), in embodiments, sends more rules information 216 (FIG. 2) to the authentication platform 200 (FIG. 2). The rule creation/learner module 308 (FIG. 3), in embodiments, receives the additional rule input 310 (FIG. 3), which may comprise transaction type information. The transaction type information may be an identifier or name for a transaction type, for example, new account creation, user access, etc. In embodiments, the rule creation/learner module 308 (FIG. 3) creates a transaction type field 404 (FIG. 4A) for the transaction type information in the authentication rules data structure 400 (FIG. 4). The transaction type information received from the entity may be stored in the transaction type field 404 (FIG. 4A) of the authentication rules data structure 400 (FIG. 4).

Receive operation 508 receives an authentication module choice for the transaction type. In embodiments, the entity operating the entity system 102 (FIG. 1) sends more rules information 216 (FIG. 2) to the authentication platform 200 (FIG. 2). The rule creation/learner module 308 (FIG. 3), in embodiments, receives the additional rule input 310 (FIG. 3), which comprises a selection of one or more authentication modules 316 (FIG. 3) for the type of transaction. The selection of one or more authentication modules 316 (FIG. 3) may be an input of an identifier for the one or more authentication modules 316 (FIG. 3) or a selection of the one or more authentication modules 316 (FIG. 3) from a user display, for example, a drop down menu in a web page. In embodiments, the rule creation/learner module 308 (FIG. 3) creates an authentication rules field 406 (FIG. 4A) including a module identifier field 408 (FIG. 4B) for the selection of one or more authentication modules 316 (FIG. 3). The selection of one or more authentication modules 316 (FIG. 3) received from the entity may be stored in the module identifier field 408 (FIG. 4B) of the authentication rules field 406 (FIG. 4A). Different rules may apply to different transactions. For example, if a user is desiring to create a new relationship with the entity, a set of rules for authentication of a new user are used. If the user is returning to access an existing account, a different set of rules may be used.

Determine operation 509 determines the information required for the one or more authentication modules 316 (FIG. 3). In embodiments, the rule creation/learner module 308 (FIG. 3) reads information about the one or more authentication modules 316 (FIG. 3) from the authentication rule datastore 306 (FIG. 3). The information includes one or more items of information needed by the one or more authentication modules 316 (FIG. 3) to attempt an authentication. The rule creation/learner module 308 (FIG. 3) can create an information required field 409 (FIG. 4B) in the authentication rules field 406 (FIG. 4A). The one or more items of information required by the one or more authentication modules 316 (FIG. 3), as determined by the rule creation/learner module 308 (FIG. 3), may be stored in the information required field 409 (FIG. 4B) of the authentication rules field 406 (FIG. 4A).

Receive operation 510 receives the success criteria for the authentication. The entity operating an entity system 102 (FIG. 1), in embodiments, sends more rules information 216 (FIG. 2) to the authentication platform 200 (FIG. 2), which comprises the success threshold for the authentication using the one or more authentication modules 316 (FIG. 3). The rule creation/learner module 308 (FIG. 3), in embodiments, receives the additional rule input 310 (FIG. 3). The success threshold information may be a score to compare to a return from the one or more authentication modules 316 (FIG. 3) or may be a simple success or failure indicator for the return by the one or more authentication modules 316 (FIG. 3). In alternative embodiments, no success threshold is provided as the one or more authentication modules 316 (FIG. 3) provide the authentication success indication. In embodiments, the rule creation/learner module 308 (FIG. 3) creates a success threshold field 410 (FIG. 4B). The success threshold received from the entity may be stored in the success threshold field 410 (FIG. 4B) of the authentication rules field 406 (FIG. 4A).

Receive operation 512 receives the reaction information. In embodiments, the entity operating an entity system 102 (FIG. 1) sends more rules information 216 (FIG. 2) to the authentication platform 200 (FIG. 2), which comprises the reaction information for the authentication using the one or more authentication modules 316 (FIG. 3). The rule creation/learner module 308 (FIG. 3), in embodiments, receives the additional rule input 310 (FIG. 3). The reaction information may be one or more instructions on how to react to the success or failure of an authentication. For example, if authentication fails using one of the one or more authentication modules 316 (FIG. 3), another of the one or more authentication modules 316 (FIG. 3) may then be used to complete the authentication. In embodiments, the rule creation/learner module 308 (FIG. 3) creates a reaction field 412 (FIG. 4B). The reaction instructions received from the entity may be stored in the reaction field 412 (FIG. 4B) of the authentication rules field 406 (FIG. 4A).

Store operation 514 stores the received information. In embodiments, the rule creation/learner module 308 (FIG. 3) stores the information received from the entity or determined for the authentication rule into the one or more fields of the authentication rules data structure 400 (FIG. 4). The information may be stored as received or the entire authentication rules data structure 400 (FIG. 4) may be written into the rules datastore 306 (FIG. 3) after all of the information is received. After storing the authentication rules data structure 400 (FIG. 4), the rule creation/learner module 308 (FIG. 3) may receive information to create a new rule for the entity.

Figure 6:
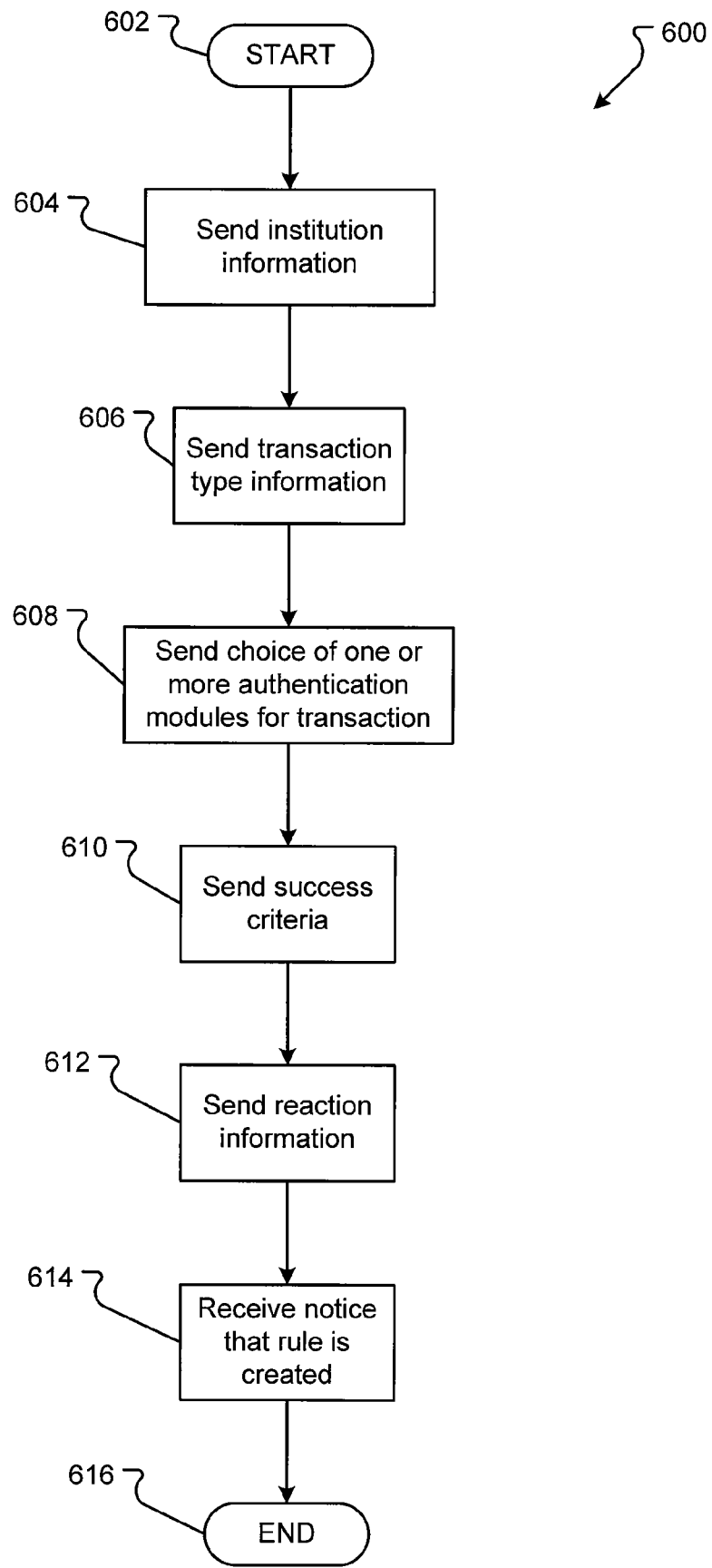
FIG. 6 is a flow diagram of an embodiment of a process for creating an authentication rule executed at an entity system.

An embodiment of a method 600 executed at an entity operating an entity system 102 (FIG. 1) for creating an authentication rule is shown in FIG. 6. In embodiments, the method 600 generally begins with a START operation 602 and terminates with an END operation 616. The steps shown in the method 600 may be executed in a computer system as a set of computer-executable instructions. While a logical order is shown in FIG. 6, the steps shown or described can, in some circumstances, be executed in a different order than presented herein.

Send operation 604 sends institution information. In embodiments, an entity operating an entity system 102 (FIG. 1) initiates the rule creation method 600. The entity may interact with a rule creation/learner module 308 (FIG. 3) to initiate the method 600. The entity operating an entity system 102 (FIG. 1), in embodiments, sends rules information 216 (FIG. 2) to the authentication platform 200 (FIG. 2). In embodiments, the entity system 102 (FIG. 1) sends rule input 310 (FIG. 3) to a creation/learner module 308 (FIG. 3) through interactions with a web service or other system or process allowing for communication between an administrator or other user at the entity and the authentication platform 200 (FIG. 2). A rule creation/learner module 308 (FIG. 3), in embodiments, receives the rule input 310 (FIG. 3). The rule input 310 (FIG. 3) can comprise an identifier for the entity. The identifier may be a name, a GUID, or other identifier for the entity.

Send operation 606 sends transaction type information. The entity operating the entity system 102 (FIG. 1), in embodiments, sends more rules information 216 (FIG. 2) to the authentication platform 200 (FIG. 2), which may comprise transaction type information. The transaction type information may be an identifier or name for a transaction type, for example, new account creation, user access, etc. Different rules may apply to different transactions. For example, if a user is desiring to create a new relationship with the entity, a set of rules for authentication of a new user are used. If the user is returning to access an existing account, a different set of rules may be used.

Send operation 608 sends a choice of an authentication module for authentication associated with the transaction type. In embodiments, the entity operating the entity system 102 (FIG. 1) sends more rules information 216 (FIG. 2) to the authentication platform 200 (FIG. 2), which comprises a selection of one or more authentication modules 316 (FIG. 3) for the type of transaction. The selection of one or more authentication modules 316 (FIG. 3) may be an input of an identifier for the one or more authentication modules 316 (FIG. 3) or a selection of the one or more authentication modules 316 (FIG. 3) from a user display, for example, a drop down menu in a web page.

Send operation 610 sends the success criteria for the authentication. In embodiments, the entity operating an entity system 102 (FIG. 1) sends more rules information 216 (FIG. 2) to the authentication platform 200 (FIG. 2), which comprises the success threshold for the authentication using the one or more authentication modules 316 (FIG. 3). The rule creation/learner module 308 (FIG. 3), in embodiments, receives the additional rule input 310 (FIG. 3). The success threshold information may be a score to compare to a return from the one or more authentication modules 316 (FIG. 3) or may be a simple success or failure indicator for the return by the one or more authentication modules 316 (FIG. 3). In alternative embodiments, no success threshold is provided as the one or more authentication modules 316 (FIG. 3) provide the authentication success indication.

Send operation 612 sends the reaction information. In embodiments, the entity operating an entity system 102 (FIG. 1) sends more rules information 216 (FIG. 2) to the authentication platform 200 (FIG. 2), which comprises the reaction information for the authentication using the one or more authentication modules 316 (FIG. 3). The rule creation/learner module 308 (FIG. 3), in embodiments, receives the additional rule input 310 (FIG. 3). The reaction information may be one or more instructions on how to react to the success or failure of an authentication. For example, if authentication fails using one of the one or more authentication modules 316 (FIG. 3), another of the one or more authentication modules 316 (FIG. 3) may then be used to complete the authentication.

Receive operation 614 receives an indication that the authentication rule was created. In embodiments, the rule creation/learner module 308 (FIG. 3) stores the information received from the entity or determined for the rule into the one or more fields of the authentication rules data structure 400 (FIG. 4). In response to storing the authentication rules data structure 400 (FIG. 4), the rule creation/learner module 308 (FIG. 3) may then send an indication to the entity system 102 (FIG. 1) that the rule was created. The indication may be a message stating that rule creation was necessary. In another embodiment, the indication is a request from the rule creation/learner module 308 (FIG. 3) to the entity system 102 (FIG. 1) to create another rule. After receiving the indication, the entity system 102 (FIG. 1) may send more information to create a new rule for the entity.

Figure 7A:
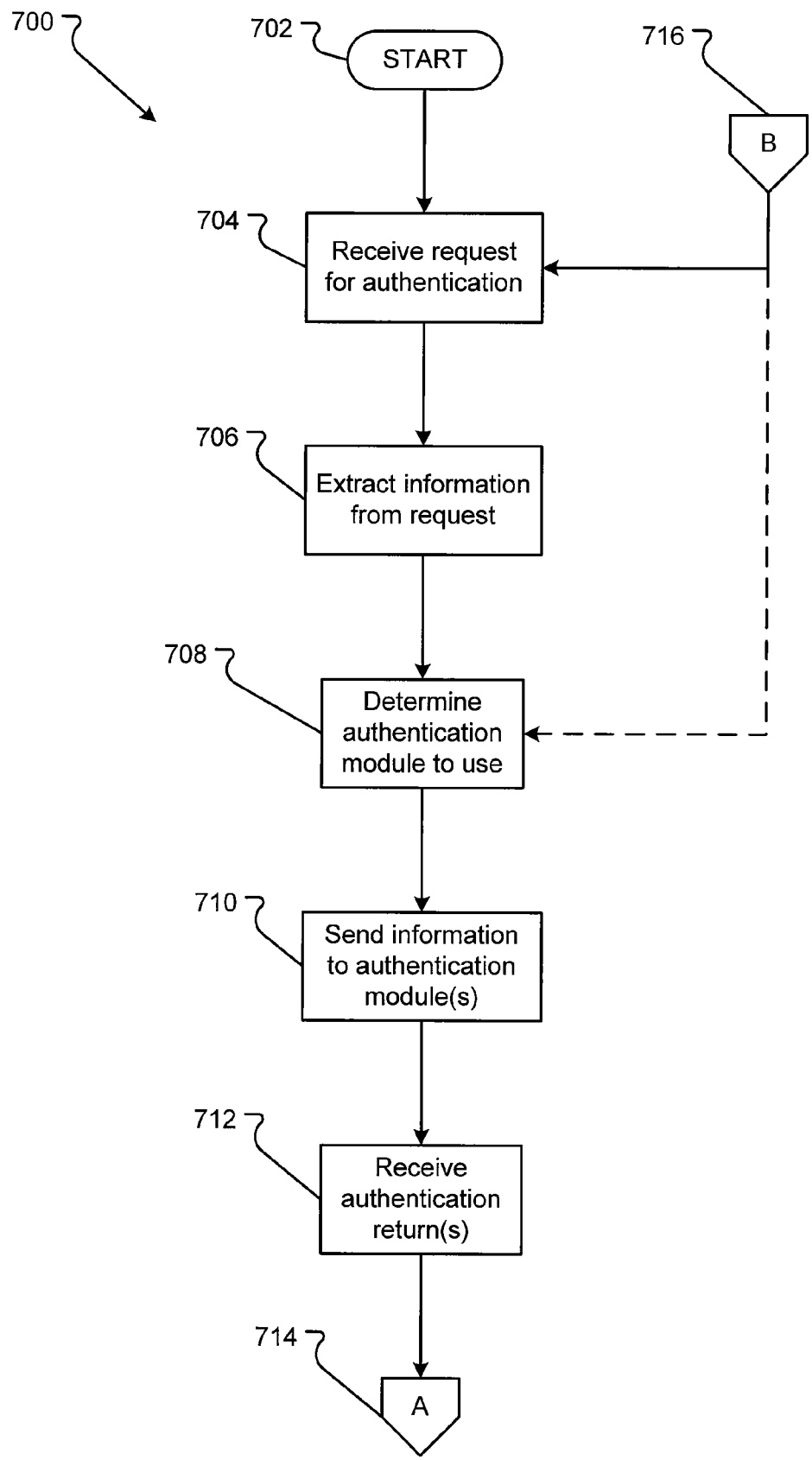
FIGS. 7A-B are flow diagrams of an embodiment of a process for authenticating a user executed at an authentication platform.
Figure 7B:
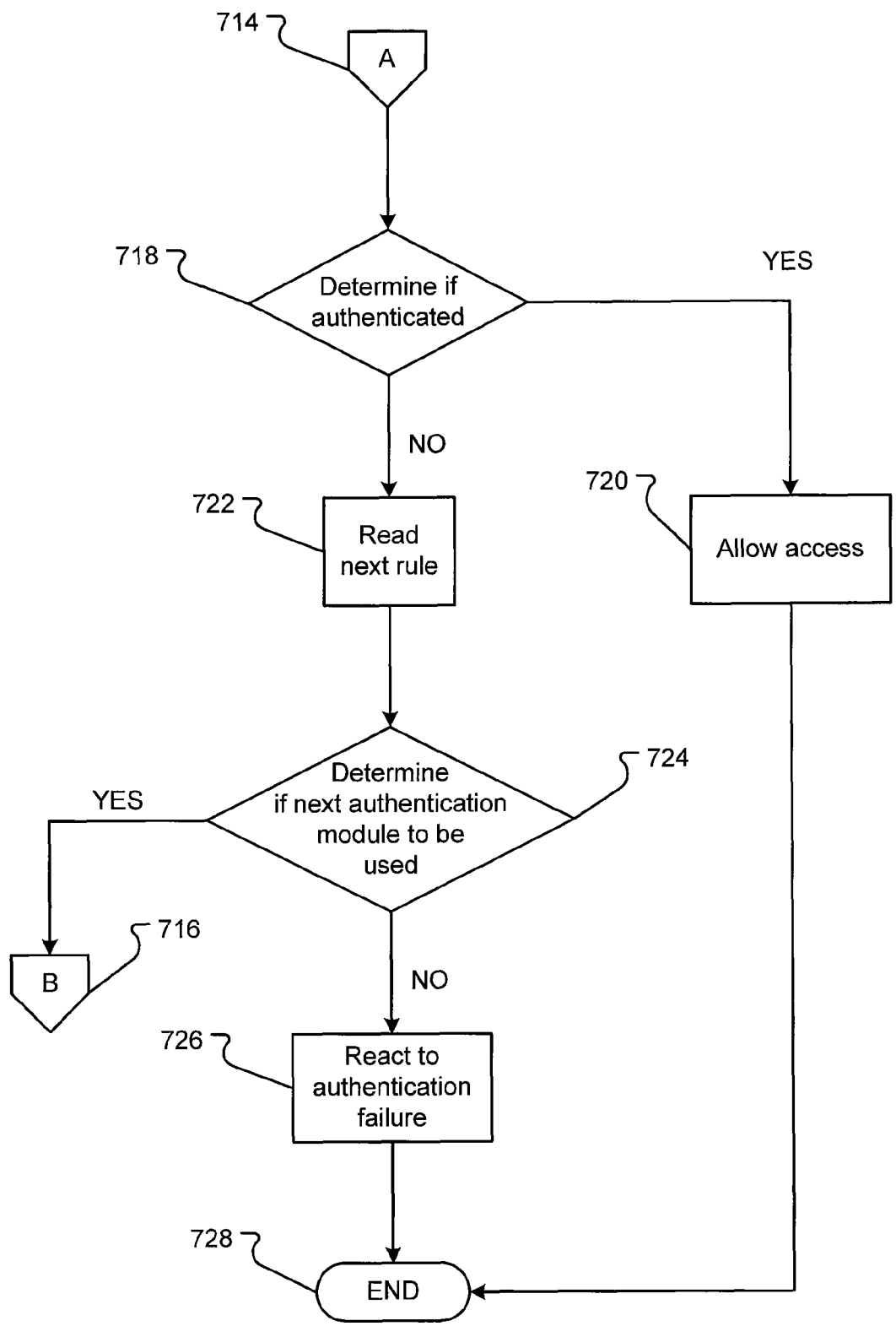

An embodiment of a method 700 executed at an authentication platform 200 (FIG. 2) for authenticating a user 106 (FIG. 1) of an entity system 102 (FIG. 1) is shown in FIGS. 7A and 7B. In embodiments, the method 700 generally begins with a START operation 702 and terminates with an END operation 728. The steps shown in the method 700 may be executed in a computer system as a set of computer-executable instructions. While a logical order is shown in FIGS. 7A and 7B, the steps shown or described can, in some circumstances, be executed in a different order than presented herein. Page connector A 714 and connector B 716 continue the flow of the method 700 between FIG. 7A and FIG. 7B.

Receive operation 704 receives a request for authentication. In embodiments, a user 106 (FIG. 1) initiates an authentication request 319 (FIG. 3). The authentication request 319 (FIG. 3) may include the user requesting a web page from an entity system 102 (FIG. 1), the user requesting a new account or relationship with the entity system 102 (FIG. 1), or the user attempting to access an existing account. The entity system 102 (FIG. 1) can require the user 106 (FIG. 1) to log-in to the entity system 102 (FIG. 1). The entity system 102 (FIG. 1) may then have the user 106 (FIG. 1) request authentication from the authentication platform 200 (FIG. 2) or may forward the authentication request to the authentication platform 200 (FIG. 2). In embodiments, the user interface 208 (FIG. 2) receives the request. In further embodiments, the information receive module 304 (FIG. 3) of the rules engine 300 (FIG. 3) receives the request 319 (FIG. 3).

Extract operation 706 extracts authentication information from the authentication request 319 (FIG. 3) or user input 318 (FIG. 3). In embodiments, the information receive module 304 (FIG. 3) extracts one or more items of information. For example, the information receive module 304 (FIG. 3) extracts the entity identifier and the type of transaction from the authentication request 319 (FIG. 3) or user input 318 (FIG. 3) to send to the authentication/measure module 302 (FIG. 3). In embodiments, the information receive module 304 (FIG. 3) provides the extracted information to the authentication/measure module 302 (FIG. 3).

Determine operation 708 determines the authentication module to use for the authentication. In embodiments, the authentication/measure module 302 (FIG. 3) accesses the rules datastore 306 (FIG. 3) to locate the rule data structure 400 (FIG. 4) associated with the entity identifier, type of transaction, and other information provided by the information receive module 304 (FIG. 3). The authentication/measure module 302 (FIG. 3) may read the institution identifier field 402 (FIG. 4A) for one or more authentication rule data structures 400 (FIG. 4) and compare the institution identifier received from the information receive module 304 (FIG. 3) to the institution identifier in the institution identifier field 402 (FIG. 4A). Upon finding a match, the authentication/measure module 302 (FIG. 3) may compare the information in the type of transaction field 404 (FIG. 4A) with the type of transaction information received from the information receive module 304 (FIG. 3). The type of transaction may be the establishment of a new account or the access of an existing account. The comparisons may continue until the authentication/measure module 302 (FIG. 3) determines the one or more authentication modules, listed in the authentication module identifier field 408 (FIG. 4B), to use for authentication.

Send operation 710 sends information to the determined authentication module. In embodiments, the authentication/measure module 302 (FIG. 3) collects one or more items of information for the identified authentication module 316 (FIG. 3). For example, the authentication/measure module 302 (FIG. 3) sends one or more other items extracted from the authentication request by the information receive module 304 (FIG. 3). In other embodiments, the authentication/measure module 302 (FIG. 3) requests the ingest module 326 (FIG. 3) to provide one or more items of information. In one embodiment, the ingest module 326 (FIG. 3) accesses the user information datastore 324 (FIG. 3) to obtain known information, for example, a computer fingerprint, a voice print, keyboard dynamics, etc., about the user 106 (FIG. 1). This known information may have been compiled from one or more previous authentications. The known information may have been used to authenticate the user previously. Known information may not be available for new users asking for an account creation.

In other embodiments, the ingest module 326 (FIG. 3) accesses information from one or more other sources via a network 322 (FIG. 3). For example, if the user 106 (FIG. 1) is requesting the creation of an account, no known information may be stored in the user information datastore 324 (FIG. 3). As such, the ingest module 326 (FIG. 3) may retrieve information from other sources. For example, an out-of-wallet authentication module 118 (FIG. 1) can authenticate a user 106 (FIG. 1) having the user 106 (FIG. 1) answer questions about a previous car the user 106 (FIG. 1) may have owned. The information about the car may be retrieved from the Department of Motor Vehicles by the ingest module 326 (FIG. 3). This retrieved information may be provided to the authentication/measure module 302 (FIG. 3) to send to the authentication module 316 (FIG. 3). In embodiments, the authentication/measure module 302 (FIG. 3) provides the request and information to the workflow manager 314 (FIG. 3) to send in the proper format to the authentication module 316 (FIG. 3).

Further communications between the authentication/measure module 302 (FIG. 3), the authentication module 316 (FIG. 3), and/or the information receive module 304 (FIG. 3) are possible to request and provide further information. For example, a one-time password authentication module 114 (FIG. 1) may request the authentication/measure module 302 (FIG. 3) to send a one-time password to the user. The authentication/measure module 302 (FIG. 3) may request the email address from the ingest module 326 (FIG. 3), which reads the email address from the user information datastore 324 (FIG. 3) and provides the email address to the authentication/measure module 302 (FIG. 3). The authentication/measure module 302 (FIG. 3) can have the information receive module 304 (FIG. 3) send an email to the user 106 (FIG. 1) with the one-time password. The information receive module 304 (FIG. 3) may then send the received password back to the authentication module 316 (FIG. 3) after the password is received from the user 106 (FIG. 1). As such, the send operation 710 continues until the authentication module 316 (FIG. 3) has the information for the authentication.

Receive operation 712 receives a return. In embodiments, the workflow manager 314 (FIG. 3) receives the return from the authentication module 316 (FIG. 3). The workflow manager 314 (FIG. 3) may translate the return for the authentication/measure module 302 (FIG. 3). The method 700 then flows through page connector A 714 to determine operation 718.

Determine operation 718 determines if the user 106 (FIG. 1) was authenticated by the authentication module 316 (FIG. 3). In embodiments, the authentication module 316 (FIG. 3) provides an indication of authentication success or failure. For example, a one-time password authentication module 114 (FIG. 1) may return an indication that the password was correct. In other embodiments, the authentication/measure module 302 (FIG. 3) determines authentication success or failure by comparing a return to a success threshold stored in a success threshold field 410 (FIG. 4B) in a rule data structure 400 (FIG. 4). The authentication/measure module 302 (FIG. 3) may retrieve the rule data structure 400 (FIG. 4) from the rules datastore 306 (FIG. 3). Then, the authentication/measure module 302 (FIG. 3) can read the success threshold from the success threshold field 410 (FIG. 4B). In embodiments, the return is then compared to the success threshold. If the return betters the threshold, the authentication/measure module 302 (FIG. 3) can indicate authentication success.

For example, a keyboard dynamics authentication module 112 (FIG. 1) may return a score of 82% as a match of the user's method for entering a word or phrase with a known method. The success threshold stored in the success threshold field 410 (FIG. 4B) may be 80%, wherein returned scores greater than 80% represent a successful authentication. The authentication/measure module 302 (FIG. 3) may compare the returned score of 82% with the threshold of 80% and indicate successful authentication.

In further embodiments, the authentication/measure module 302 (FIG. 3) may interact with two or more authentication modules 316 (FIG. 3) and require success from each of the authentication modules 316 (FIG. 3). If authentication is successful, the method 700 flows YES to allow operation 720. If the user 106 (FIG. 1) fails the authentication, the method 700 flows NO to read operation 722.

Allow operation 720 allows access. In embodiments, the authentication/measure module 302 (FIG. 3) allows the user 106 (FIG. 1) to access the entity system 102 (FIG. 1) after successful authentication. The authentication/measure module 302 (FIG. 3) may send an authentication signal 322 (FIG. 3) to the user 106 (FIG. 1) to indicate successful authentication and may send authentication signal 312 (FIG. 3) to the entity system 102 (FIG. 1) to instruct the entity that the user 106 (FIG. 1) is authenticated and should be allowed access.

Read operation 722 reads a next rule. After authentication failure, the authentication/measure module 302 (FIG. 3) determines what to do next. In embodiments, the authentication/measure module 302 (FIG. 3) reads the reaction field 412

(FIG. 4B) to retrieve instructions for how to respond to the authentication failure. The information in the reaction field 412 (FIG. 4B) may represent the rule read by the authentication/measure module 302 (FIG. 3). In another embodiment, the reaction field 412 (FIG. 4B) instructs the authentication/measure module 302 (FIG. 3) to access a different rule data structure 400 (FIG. 4) stored in the rules datastore 306 (FIG. 3). For example, the reaction field 412 (FIG. 4B) contains another set of authentication module identifier 408 (FIG. 4B) or other information with an instruction to authenticate using the different authentication module 316 (FIG. 3). This separate authentication rule may represent the rule read by the authentication/measure module 302 (FIG. 3).

Determine operation 724 determines if a next authentication module is to be used. If the reaction field 412 (FIG. 4B) has information to use another authentication module, the authentication/measure module 302 (FIG. 3) determines that another authentication module is to be used, and the method 700 flows YES through page connector B 716 back to receive operation 704. In embodiments, the authentication/measure module 302 (FIG. 3) collects more information for the next-used authentication module 316 (FIG. 3). In an alternative embodiment, all needed information was already collected and the method flows YES to determine operation 708. If the reaction field 412 (FIG. 4B) does not require the use of another authentication module, the authentication/measure module 302 (FIG. 3) determines that another authentication module is not to be used, and the method flows NO to react operation 726.

React operation 726 responds to authentication failure. In embodiments, the reaction field 412 (FIG. 4B) contains instructions for a failure to authenticate. The authentication/measure module 302 (FIG. 3) can read the instructions from the reaction field 412 (FIG. 4B) and execute the instructions. In one embodiment, the authentication/measure module 302 (FIG. 3) denies the user 106 (FIG. 1) access by informing the entity system 102 (FIG. 1) not to allow access. In another embodiment, the authentication/measure module 302 (FIG. 3) sends a message to the user 106 (FIG. 1) to contact customer service personnel. In still another embodiment, the authentication/measure module 302 (FIG. 3) informs a security entity for the entity system 102 (FIG. 1) that the user may be a potential fraudster and action is required to protect the entity system 102 (FIG. 1).

In an alternative embodiment, the authentication/measure module 302 (FIG. 3) sends information to two or more authentication modules during the send operation 710. The two or more returns are received in the receive operation 712. The authentication/measure module 302 (FIG. 3) can then use the combined returns to determine if the user is authenticated in determine operation 718.

Figure 8:
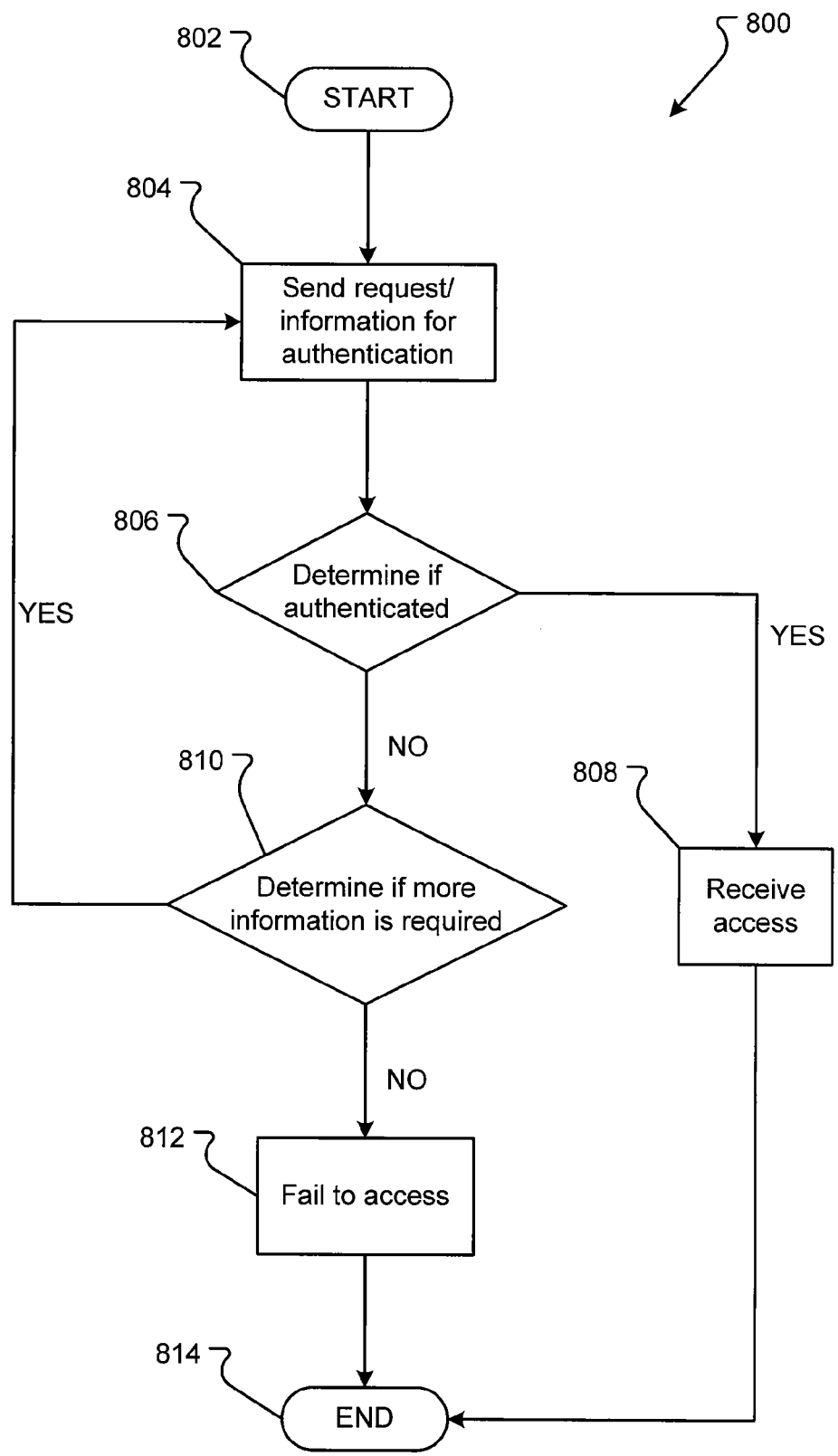
FIG. 8 is a flow diagram of an embodiment of a process for authenticating a user executed at a user computer.

An embodiment of a method 800 executed by a user 106 (FIG. 1) for authenticating the user 106 (FIG. 1) of an entity system 102 (FIG. 1) is shown in FIG. 8. In embodiments, the method 800 generally begins with a START operation 802 and terminates with an END operation 814. The steps shown in the method 800 may be executed in a computer system as a set of computer-executable instructions. While a logical order is shown in FIG. 8, the steps shown or described can, in some circumstances, be executed in a different order than presented herein.

Send operation 804 sends a request for authentication and/or authentication information. In embodiments, the user 106 (FIG. 1) initiates an authentication request. The authentication request 319 (FIG. 3) may include the user 106 (FIG. 1) requesting a web page from an entity system 102 (FIG. 1), the user requesting a new account or relationship with the entity system 102 (FIG. 1), or the user attempting to access an existing account. The entity system 102 (FIG. 1) may require the user 106 (FIG. 1) to log-in to the entity system 102 (FIG. 1). The entity system 102 (FIG. 1) may then have the user 106 (FIG. 1) request authentication from the authentication platform 200 (FIG. 2) or may forward the authentication request to the authentication platform 200 (FIG. 2). In embodiments, the user interface 208 (FIG. 2) receives the request 319 (FIG. 3). In further embodiments, the information receive module 304 (FIG. 3) of the rules engine 300 (FIG. 3) receives the request 319 (FIG. 3).

In embodiments, the user 106 (FIG. 1) may also send one or more items of authentication information 318 (FIG. 3) requested by identified authentication module 316 (FIG. 3). For example, the authentication/measure module 302 (FIG. 3) requests one or more other items of information 318 (FIG. 3) from the user 106 (FIG. 1). In other embodiments, the authentication/measure module 302 (FIG. 3) requests the ingest module 326 (FIG. 3) to provide one or more items of information. For example, a one-time password authentication module 114 (FIG. 1) may request the authentication/measure module 302 (FIG. 3) to send a one-time password to the user 106 (FIG. 1). The authentication/measure module 302 (FIG. 3) may request the email address from the ingest module 326 (FIG. 3), which reads the email from the user information datastore 324 (FIG. 3) and provides the email address to the authentication/measure module 302 (FIG. 3). The authentication/measure module 302 (FIG. 3) can have the information receive module 304 (FIG. 3) send an email to the user 106 (FIG. 1) with the one-time password. The user 106 (FIG. 1) may access his or her email account to retrieve the one-time password. The one-time password may then be sent to the authentication platform 200 (FIG. 2). As such, the send operation 804 continues until the authentication module 316 (FIG. 3) has the information for the authentication.

Determine operation 806 determines if the user 106 (FIG. 1) was authenticated. In embodiments, the authentication/measure module 302 (FIG. 3) allows the user 106 (FIG. 1) to access the entity system 102 (FIG. 1) after successful authentication. The authentication/measure module 302 (FIG. 3) may send an authentication signal 322 (FIG. 3) to the user 106 (FIG. 1) to indicate successful authentication and may send authentication signal 312 (FIG. 3) to the entity system 102 (FIG. 1) to instruct the entity that the user 106 (FIG. 1) is authenticated and should be allowed access. If the user 106 (FIG. 1) receives the authentication signal 322 (FIG. 3), the user 106 (FIG. 1) determines that he or she has been authenticated, and the method flows YES to receive operation 808. If the user 106 (FIG. 1) does not receive the authentication signal 322 (FIG. 3), the user 106 (FIG. 1) determines that he or she has not been authenticated, and the method flows NO to determine operation 810.

Receive operation 808 receives user access. In embodiments, the user 106 (FIG. 1) gains access to the entity system 102 (FIG. 1) after receiving authentication signal 322 (FIG. 3) allows the user 106 (FIG. 1). The user 106 (FIG. 1) can then begin to use the entity system 102 (FIG. 1).

Determine operation 810 determines if more information is required. In embodiments, the reaction field 412 (FIG. 4B) instructs the authentication/measure module 302 (FIG. 3) to access a different authentication rule data structure 400 (FIG. 4) stored in the rules datastore 306 (FIG. 3). For example, the reaction field 412 (FIG. 4B) contains another set of authentication module identifier 408 (FIG. 4B) or other information with an instruction to authenticate using the different authentication module 316 (FIG. 3). In embodiments, the authentication/measure module 302 (FIG. 3) collects more information for the next-used authentication module 316 (FIG. 3). If more information is required, the method 800 flows YES back to send operation 804. In embodiments, the user 106 (FIG. 1) provides the additional information required by sending the information to the authentication platform 100 (FIG. 1). If no more information is required, the method 800 flows NO to fail operation 812. Fail operation 812 fails to provide access. In embodiments, the user 106 (FIG. 1) receives an indication that authentication failed and he or she will not be given access. The user 106 (FIG. 1) may then attempt another authentication.

Figure 9:
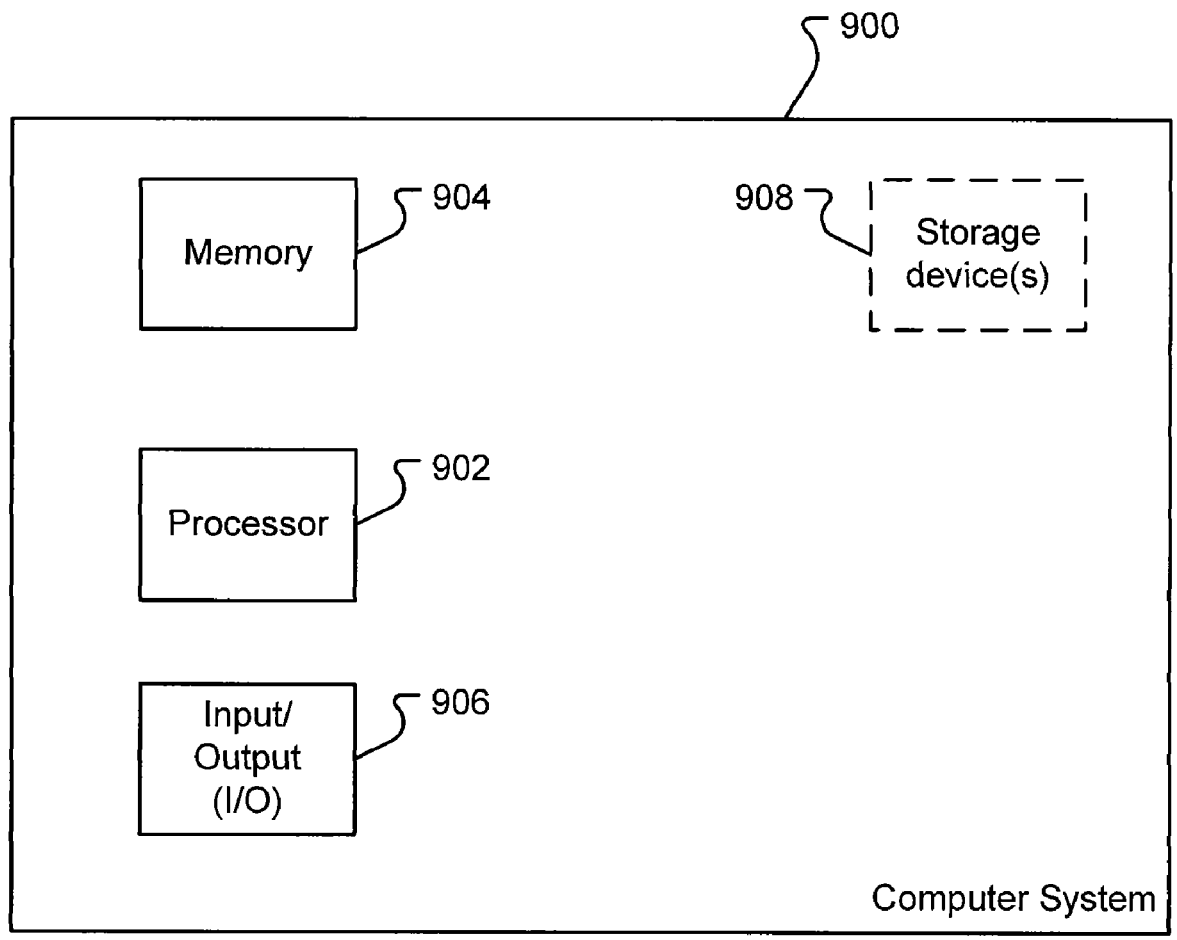
FIG. 9 is a block diagram of an embodiment of a computer system for use in the system for authenticating a user.

Embodiments of the different systems represented in this disclosure, which may include the user system 106 (FIG. 1), the authentication platform 100 (FIG. 1), and/or the entity system 102 (FIG. 1), may be a computer system, such as computer system 900 shown in FIG. 9. A basic computer system is shown as one skilled in the art will recognize the technical changes and modifications that may be required to make the systems described herein operable. The computer system 900 comprises a processor 902, which completes the operations described in conjunction with FIGS. 5 through 8 or makes the systems operable described in conjunction with FIGS. 1 through 3. The processor 902 may be any type of processor operable to complete the operations or implement the systems described herein. For example, the processor 902 may be an Intel Pentium processor, an application specific integrated circuit (ASIC), a field programmable gate array (FPGA), or other device.

The computer system 900 also comprises memory 904 to hold data or code being executed by processor 902. The memory 904 may permanently or temporarily store the instructions described in conjunction with FIGS. 5 through 8 or the data elements described in conjunction with FIGS. 4A and 4B. Memory may be classified as computer readable medium, for example, RAM, ROM, magnetic media, optical media, etc.

The computer system 900 also can comprise software elements, including an operating system and/or other code, such as one or more application programs for creating an authentication rule at the authentication platform 100 (FIG. 1) with interaction with entity system 102 (FIG. 1) or authenticating a user with the authentication platform 100 (FIG. 1) with interactions with a user 106 (FIG. 1). The application programs may comprise computer programs described herein, and/or may be designed to implement methods described herein and/or configure systems described herein. Merely by way of example, one or more procedures described with respect to the method(s) discussed in conjunction with FIGS. 5 through 8 might be implemented as code and/or instructions executable by the computer system 900 (and/or the processor 902 within the computer 900).

A set of these instructions and/or code might be stored on a computer readable storage medium, such as the storage device(s) 908 or memory 904. In some cases, the storage medium might be incorporated within a computer system. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Further embodiments of the computer system 900 comprises input/output (I/O) modules of systems 906. I/O systems 906 may include displays such as LCDs, plasma screen, cathode ray tubes, etc. The I/O systems 906 can provide a visual representation of data to a user 106 (FIG. 1) or the entity system 102 (FIG. 1). I/O system 906 may also include input devices such as mice, keyboards, touch screens, etc. Input devices or the communications interfaces with other systems allow the user 106 (FIG. 1) or entity system 102 (FIG. 1) to input information into the authentication platform 100 (FIG. 1). I/O systems 906 may also comprise communication systems such as wired, wireless, or other communication systems. Further, communication systems may communicate with peripheral devices, such as printers, modems, or other devices.

In light of the above description, a number of advantages of the present disclosure are readily apparent. For example, the systems described herein allow entities, such as banks, or other institutions, to authenticate a user using one or many authentication processes. The institutions can customize how to authenticate users using different authentication methods, can customize the different intensities of authentication (e.g., how high to set success thresholds), and can customize the responses to authentication failures. Further, the authentication platform 100 (FIG. 1) can easily integrate or remove authentication modules without changing the interfaces for the user or the entity. Thus, the authentication systems are easily upgraded as new types of authentication are introduced in the market. The easy upgrading of the authentication platform 100 (FIG. 1) ensures the authentication platform 100 (FIG. 1) can adapt to meet ever-changing security needs of the different entities.

A number of variations and modifications of the disclosure can also be used. For example, the entity system may integrate the authentication platform 100 (FIG. 1) into the entity system 102 (FIG. 1). In other embodiments, the authentication platform 100 (FIG. 1) can be a hosted platform contacted by two or more entities. As such, the authentication platform 100 (FIG. 1) can meet the authentication needs of two or more entities using the same system. The authentication platform 100 (FIG. 1) would create different authentication rules for the different entities and store the authentication rules in the rules datastore 306 (FIG. 3).

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

While the principles of the disclosure have been described above in connection with specific apparatuses and methods, it is to be clearly understood that this description is made only by way of example and not as limitation on the scope of the disclosure.

What is claimed is:

1. An authentication platform for authenticating a user desiring access to an entity system, the authentication platform comprising:
   two or more authentication modules, each authentication module operable to authenticate the user using a different authentication method;
   a decision engine in communication with the two or more authentication modules, the decision engine operable to receive an authentication request from the user, the decision engine operable to send one or more items of authentication information to a first authentication module to authenticate the user, the decision engine operable to receive a return from the first authentication module, the decision engine operable to determine if the user has been authenticated by the first authentication module, the decision engine operable to inform the user that the user has been authenticated; and a user interface, the user interface operable to receive the authentication request, the user interface operable to receive one or more items of the authentication information from the user;

an institution interface, the institution interface operable to receive one or more authentication rules from one or more entities;

an authentication module interface, the authentication module interface operable to send information to one of the two or more authentication modules for authentication, the authentication module interface operable to receive the return from one of the two or more authentication modules for authentication;

a rules datastore, the rules datastore operable to store one or more authentication rules; and a rules engine in communication with the user interface, the institution interface, the authentication module interface, and the rules datastore, the rules engine operable to store one or more authentication rules received from the institution interface into the rules datastore, the rules engine operable to receive an authentication request and the one or more items of authentication information from the user interface, the rules engine operable to read a rule from the rules datastore associated with the authentication request, the rules engine operable to send the authentication information to the authentication module interface for the first authentication module identified in the rules the rules engine operable to receive a return from the first authentication module, the rules engine operable to determine if the user has been authenticated by the first authentication module, and the rules engine operable to inform the user that the user has been authenticated by sending a message through the user interface.

2. The authentication platform as defined in claim 1, wherein the rules engine comprises:
a rule creation/learner module, the rule creation/learner module operable to receive the one or more authentication rules from the institution interface, the rule creation/learner module operable to store the one or more authentication rules in the rules datastore.

3. The authentication platform as defined in claim 1, wherein the rules engine comprises:
an information receive module, the information receive module operable to receive the authentication request and the one or more items of authentication information from the user, the information receive module operable to extract the one or more items of authentication information, the information receive module operable to request one or more other items of authentication information from the user; the information receive module operable to receive the one or more other items of authentication information from the user.

4. The authentication platform as defined in claim 3, wherein the rules engine comprises:
an ingest module, the ingest module operable to store one or more items of authentication information received from the user in a user information datastore, the ingest module operable to provide the one or more items of authentication information from the user information datastore, and the ingest module operable to retrieve one or more items of authentication information from one or more other sources accessed through a network.

5. The authentication platform as defined in claim 1, wherein the rules engine comprises:
a workflow manager module, the workflow manager module operable to send the one or more items of authentication information to one or more authentication modules, the workflow manager module operable to receive a return from the one or more authentication modules.

6. The authentication platform as defined in claim 1, wherein the rules engine comprises:
an authentication/measure module, the authentication/measure module operable to receive an authentication request and the one or more items of authentication information from an information receive module, the authentication/measure module operable to read a rule from the rules datastore associated with the authentication request, the authentication/measure module operable to send the authentication information to a workflow manager module for the first authentication module identified in the rule, the authentication/measure module operable to receive a return from the workflow manager module, the authentication/measure module operable to determine if the user has been authenticated by the first authentication module, and the authentication/measure module operable to inform the user that the user has been authenticated by sending an authentication signal to the user.

7. The authentication platform as defined in claim 6, wherein the authentication/measure module is operable to determine that more authentication information is needed from the user, the authentication/measure module operable to request the information receive module to provide the more authentication information, and the information receive module operable to request the more authentication information.

8. A method for authenticating a user of an entity system using an authentication platform, the method comprising:
receiving an authentication request from the user;
extracting one or more items of authentication information;
determining a first authentication module to use for the authentication;
sending at least one of the one or more items of extracted authentication information to a first authentication module;
receiving a return from the first authentication module;
determining if the user has been authenticated by the first authentication module;
if the user has been authenticated, allowing the user access to the entity system; and
if the user has not been authenticated, denying the user access to the entity system;
wherein determining a first authentication module to use for the authentication comprises:
reading an authentication rule from a rules datastore; and
reading an authentication module identifier for the authentication rule.

9. The method as defined in claim 8, further comprising:
receiving institution information from the entity system;
receiving transaction type information from the entity system;
receiving a choice of one or more authentication modules from the entity system;
determining authentication information required for the chosen one or more authentication modules;
receiving success criteria from the entity system;

receiving reaction information from the entity system; and storing the institution information, the transaction type information, the choice of one or more authentication modules, the authentication information required, the success criteria, and the reaction information into an authentication rule data structure.

10. A computer program stored on a computer readable medium, the computer program embodied in one or more instructions for authenticating a user of an entity system, the computer program comprising:

instructions to receive an authentication request;

instructions to determine the entity system associated with the authentication request;

instructions to determine a type of transaction associated with the authentication request;

instructions to locate an authentication rule associated with the entity system and the type of transaction;

instructions to read the authentication rule;

instructions to determine the authentication module associated with the authentication rule;

instructions to provide one or more items of authentication information to the authentication module;

instructions to receive a return from the authentication module; and instructions to determine if the user is authenticated according to the return;

instructions to receive institution information from the entity system;

instructions to receive transaction type information from the entity system;

instructions to receive a choice of one or more authentication modules from the entity system;

instructions to determine authentication information required for the chosen one or more authentication modules;

instructions to receive success criteria from the entity system;

instructions to receive reaction information from the entity system;

instructions to create the authentication rule; and instructions to store the institution information, the transaction type information, the choice of one or more authentication modules, the authentication information required, the success criteria, and the reaction information into the authentication rule.

11. The computer program as defined in claim 10, wherein the institution information is stored in an institution information field, the transaction type information is stored in a transaction type field, the choice of one or more authentication modules is stored in an authentication module identifier field, the authentication information required is stored in an information required field, the success criteria is stored in a success threshold field, and the reaction information is stored in a reaction field.

12. An authentication platform for authenticating a user desiring access to an entity system, the authentication platform comprising:

two or more authentication modules, each authentication module operable to authenticate the user using a different authentication method;

a decision engine in communication with the two or more authentication modules, the decision engine operable to receive an authentication request from the user, the decision engine operable to send one or more items of authentication information to a first authentication module to authenticate the user, the decision engine operable to receive a return from the first authentication module, the decision engine operable to determine if the user has been authenticated by the first authentication module, the decision engine operable to inform the user that the user has been authenticated;

wherein the decision engine is operable to send one or more items of information to a second authentication module to authenticate the user if the first authentication module failed to authenticate the user, the decision engine operable to receive a return from the second authentication module, the decision engine operable to determine if the user has been authenticated by the second authentication module, the decision engine operable to inform the user that the user has been authenticated.

13. An authentication platform for authenticating a user desiring access to an entity system, the authentication platform comprising:

two or more authentication modules, each authentication module operable to authenticate the user using a different authentication method;

a decision engine in communication with the two or more authentication modules, the decision engine operable to receive an authentication request from the user, the decision engine operable to send one or more items of authentication information to a first authentication module to authenticate the user, the decision engine operable to receive a return from the first authentication module, the decision engine operable to determine if the user has been authenticated by the first authentication module, the decision engine operable to inform the user that the user has been authenticated;

a user system in communication with the decision engine; and an entity system in communication with the decision engine.

14. A method for authenticating a user of an entity system using an authentication platform, the method comprising:

receiving an authentication request from the user;

extracting one or more items of authentication information;

determining a first authentication module to use for the authentication;

sending at least one of the one or more items of extracted authentication information to a first authentication module;

receiving a return from the first authentication module;

determining if the user has been authenticated by the first authentication module;

if the user has been authenticated, allowing the user access to the entity system; and if the user has not been authenticated, denying the user access to the entity system; and if the user has not been authenticated, sending at least one of the one or more items of extracted authentication information to a second authentication module;

receiving a return from the second authentication module;

determining if the user has been authenticated by the second authentication module;

if the user has been authenticated, allowing the user access to the entity system; and if the user has not been authenticated, denying the user access to the entity system.

15. A method for authenticating a user of an entity system using an authentication platform, the method comprising:

receiving an authentication request from the user;

extracting one or more items of authentication information;

determining a first authentication module to use for the authentication;

sending at least one of the one or more items of extracted authentication information to a first authentication module;

receiving a return from the first authentication module;

determining if the user has been authenticated by the first authentication module;

if the user has been authenticated, allowing the user access to the entity system;

if the user has not been authenticated, denying the user access to the entity system;

reading the score from a success threshold field of an authentication rule stored in a rules datastore;

comparing a returned score returned by the first authentication module with the score stored in the authentication rule; and determining if the returned score betters the score stored in the authentication rule.

16. A method for authenticating a user of an entity system using an authentication platform, the method comprising:

receiving an authentication request from the user;

extracting one or more items of authentication information;

determining a first authentication module to use for the authentication;

sending at least one of the one or more items of extracted authentication information to a first authentication module;

receiving a return from the first authentication module;

determining if the user has been authenticated by the first authentication module;

if the user has been authenticated, allowing the user access to the entity system;

if the user has not been authenticated, denying the user access to the entity system;

requesting further authentication information from the user;

receiving the further authentication information from the user; and sending at least a portion of the further authentication information to the first authentication module.

17. A computer program stored on a computer readable medium, the computer program embodied in one or more instructions for authenticating a user of an entity system, the computer program comprising:

instructions to receive an authentication request;

instructions to determine the entity system associated with the authentication request;

instructions to determine a type of transaction associated with the authentication request;

instructions to locate an authentication rule associated with the entity system and the type of transaction;

instructions to read the authentication rule;

instructions to determine the authentication module associated with the authentication rule;

instructions to provide one or more items of authentication information to the authentication module;

instructions to receive a return from the authentication module; and instructions to determine if the user is authenticated according to the return; and instructions to send an authentication signal to the user indicating the user has been authenticated.

* * * * *